United States Patent
Wakabayashi

(10) Patent No.: US 10,926,533 B2
(45) Date of Patent: Feb. 23, 2021

(54) INKJET PRINTER WITH INKJET HEADS IN OVERLAPPING ARRANGEMENT

(71) Applicant: RISO KAGAKU CORPORATION, Tokyo (JP)

(72) Inventor: Mamoru Wakabayashi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/487,601

(22) PCT Filed: Mar. 5, 2018

(86) PCT No.: PCT/JP2018/008352
§ 371 (c)(1),
(2) Date: Aug. 21, 2019

(87) PCT Pub. No.: WO2018/173723
PCT Pub. Date: Sep. 27, 2018

(65) Prior Publication Data
US 2020/0055310 A1    Feb. 20, 2020

(30) Foreign Application Priority Data

Mar. 24, 2017    (JP) .............................. 2017-059086

(51) Int. Cl.
*B41J 2/045*    (2006.01)

(52) U.S. Cl.
CPC ....... *B41J 2/04505* (2013.01); *B41J 2/04586* (2013.01)

(58) Field of Classification Search
CPC ...... B41J 2/04505; B41J 2/155; B41J 2/2146; B41J 29/38; B41J 2/04586; B41J 2/145; B41J 2/2132; B41J 2/04568; B41J 2/2135; G06K 15/107
See application file for complete search history.

(56) References Cited

U.S. PATENT DOCUMENTS 8,430,473 B2    4/2013    Miyamoto

FOREIGN PATENT DOCUMENTS

| JP | 2009-160876 A | 7/2009 |
|---|---|---|
| JP | 2010-194737 A | 9/2010 |
| JP | 2011-189512 A | 9/2011 |
| WO | 2016/165777 A1 | 10/2016 |

OTHER PUBLICATIONS

International Search Report and Written Opinion of the International Searching Authority issued in International Application No. PCT/JP2018/008352, dated Apr. 3, 2018.

*Primary Examiner* — Jannelle M Lebron
(74) *Attorney, Agent, or Firm* — Greenblum & Bernstein, P.L.C.

(57) ABSTRACT

An inkjet printer includes first and second inkjet heads arranged to partially overlap each other in a main scanning direction and configured to eject ink to a print medium conveyed in a direction orthogonal to the main scanning direction and a controller. The controller is configured to perform a distribution processing of distributing a number of drops of ink for each of pixels in an image to be printed by an overlap portion of the first inkjet head and the second inkjet head based on a random number between first nozzles of the first inkjet head and second nozzles of the second inkjet head overlapping each other.

7 Claims, 16 Drawing Sheets

| NUMBER OF DROPS | RANDOM NUMBER | DISTRIBUTION OF NUMBER OF DROPS |
|---|---|---|
| ZERO DROPS | — | FRONT INKJET HEAD: ZERO DROPS<br>REAR INKJET HEAD: ZERO DROPS |
| ONE DROP | — | FRONT INKJET HEAD: ONE DROP<br>REAR INKJET HEAD: ZERO DROPS |
| TWO DROPS | 0 | FRONT INKJET HEAD: ONE DROP<br>REAR INKJET HEAD: ONE DROP |
| TWO DROPS | 1 | FRONT INKJET HEAD: TWO DROPS<br>REAR INKJET HEAD: ZERO DROPS |
| THREE DROPS | 0 | FRONT INKJET HEAD: TWO DROPS<br>REAR INKJET HEAD: ONE DROP |
| THREE DROPS | 1 | FRONT INKJET HEAD: THREE DROPS<br>REAR INKJET HEAD: ZERO DROPS |

| NUMBER OF DROPS | RANDOM NUMBER | DISTRIBUTION OF NUMBER OF DROPS |
|---|---|---|
| ZERO DROPS | — | FRONT INKJET HEAD: ZERO DROPS<br>REAR INKJET HEAD: ZERO DROPS |
| ONE DROP | — | FRONT INKJET HEAD: ZERO DROPS<br>REAR INKJET HEAD: ONE DROP |
| TWO DROPS | 0 | FRONT INKJET HEAD: ONE DROP<br>REAR INKJET HEAD: ONE DROP |
| TWO DROPS | 1 | FRONT INKJET HEAD: ZERO DROPS<br>REAR INKJET HEAD: TWO DROPS |
| THREE DROPS | 0 | FRONT INKJET HEAD: ONE DROP<br>REAR INKJET HEAD: TWO DROPS |
| THREE DROPS | 1 | FRONT INKJET HEAD: ZERO DROPS<br>REAR INKJET HEAD: THREE DROPS |

| NUMBER OF DROPS | RANDOM NUMBER || DISTRIBUTION OF NUMBER OF DROPS |
|---|---|---|---|
| ZERO DROPS | — || FRONT INKJET HEAD: ZERO DROPS<br>REAR INKJET HEAD: ZERO DROPS |
| ONE DROP | 0 | 0 | FRONT INKJET HEAD: ONE DROP<br>REAR INKJET HEAD: ZERO DROPS |
| | 0 | 1 | FRONT INKJET HEAD: ZERO DROPS<br>REAR INKJET HEAD: ONE DROP |
| | 1 | 0 | FRONT INKJET HEAD: ONE DROP<br>REAR INKJET HEAD: ZERO DROPS |
| | 1 | 1 | FRONT INKJET HEAD: ZERO DROPS<br>REAR INKJET HEAD: ONE DROP |
| TWO DROPS | 0 | 0 | FRONT INKJET HEAD: TWO DROPS<br>REAR INKJET HEAD: ZERO DROPS |
| | 0 | 1 | FRONT INKJET HEAD: ZERO DROPS<br>REAR INKJET HEAD: TWO DROPS |
| | 1 | 0 | FRONT INKJET HEAD: ONE DROP<br>REAR INKJET HEAD: ONE DROP |
| | 1 | 1 | FRONT INKJET HEAD: ONE DROP<br>REAR INKJET HEAD: ONE DROP |
| THREE DROPS | 0 | 0 | FRONT INKJET HEAD: THREE DROPS<br>REAR INKJET HEAD: ZERO DROPS |
| | 0 | 1 | FRONT INKJET HEAD: ZERO DROPS<br>REAR INKJET HEAD: THREE DROPS |
| | 1 | 0 | FRONT INKJET HEAD: TWO DROPS<br>REAR INKJET HEAD: ONE DROP |
| | 1 | 1 | FRONT INKJET HEAD: ONE DROP<br>REAR INKJET HEAD: TWO DROPS |

INKJET PRINTER WITH INKJET HEADS IN OVERLAPPING ARRANGEMENT

TECHNICAL FIELD

The present invention relates to an inkjet printer which prints an image by ejecting ink from inkjet heads to a print medium.

BACKGROUND ART

There is known an inkjet printer which prints an image by ejecting ink from multiple inkjet heads to a print medium, the inkjet heads arranged in a main scanning direction while zigzagging. In such an inkjet printer, the entire image is formed by combining images printed by the respective inkjet heads.

In the inkjet printer as described above, ink ejection characteristics vary among the inkjet heads due to manufacturing errors and the like of the inkjet heads. This causes color unevenness in an image printed in a seam portion (overlap portion) between the inkjet heads adjacent to each other in the main scanning direction and print image quality decreases in some cases.

In this respect, an inkjet printer of Patent Literature 1 is provided with a color conversion table for each inkjet head depending on ejection characteristics of the inkjet head. A print density difference caused by differences in the ejection characteristics between the inkjet heads is thereby reduced. In this case, the color conversion table is a table for converting gray level values in an RGB color space which is a color space of image data to gray level values in a CMYK color space which corresponds to colors of inks used in the inkjet printer.

Moreover, in Patent Literature 1, a combined color conversion table is created for each overlap portion of the inkjet heads by combining the color conversion table for one of the overlapping inkjet heads and the color conversion table for the other inkjet head. Image data to be printed in the overlap portion of the inkjet heads is subjected to color conversion by using the combined color conversion table. This can make the print density difference between the inkjet heads less visible and reduce the color unevenness in an image printed in the overlap portion.

CITATION LIST

Patent Literature

Patent Literature 1: Japanese Patent Application Publication No. 2011-189512

SUMMARY OF INVENTION

In the technique of Patent Literature 1, density adjustment is performed by adjusting the gray level values. For this reason, in the case of printing an image in a low gray level, in particular, fine density adjustment is difficult and the color unevenness of the image printed in the overlap portion of the inkjet heads adjacent to each other in the main scanning direction sometimes remains. Accordingly, an effect of lessening the decrease in print image quality is not sufficient.

An object of the present invention is to provide an inkjet printer which can lessen a decrease in print image quality.

An inkjet printer in accordance with some embodiments of the present invention includes: a first inkjet head including first nozzles arranged in a main scanning direction, the first inkjet head configured to eject ink to a print medium conveyed in a direction orthogonal to the main scanning direction; a second inkjet head including second nozzles arranged in the main scanning direction, the second inkjet head configured to eject ink to the print medium conveyed in the direction orthogonal to the main scanning direction; and a controller configured to control the first inkjet head and the second inkjet head to eject the ink from the first nozzles and the second nozzles respectively and print an image on the print medium, based on an image data indicating a number of drops of ink for each of pixels. The first inkjet head and the second inkjet head are arranged to partially overlap each other in the main scanning direction. The controller is configured to perform a distribution processing of distributing the number of drops of the ink for each of the pixels in the image to be printed by an overlap portion of the first inkjet head and the second inkjet head based on a random number between the first nozzles of the first inkjet head and the second nozzles of the second inkjet head overlapping each other.

According to the aforementioned configuration, the number of drops to be ejected from the first nozzle in the first inkjet head and the number of drops to be ejected from the second nozzle in the second inkjet head are randomly combined in an area to be printed in the overlap portion of the inkjet heads. Accordingly, a density difference caused by differences in ejection characteristics between the inkjet heads is less visible in an image printed in the overlap portion of the inkjet heads. As a result, color unevenness in the image printed in the overlap portion decreases and the decrease in the print image quality can be thereby lessened.

The controller may be configured to perform the distribution processing in which priorities of distribution of the number of drops to the first inkjet head and the second inkjet head are changed by degrees in the main scanning direction in the overlap portion.

According to the aforementioned configuration, it is possible to reduce the density difference in the printed image caused by the differences in ejection characteristics between the inkjet heads overlapping each other while suppressing the decrease in print image quality caused by excessively-random distribution of the number of drops.

The controller may be capable of selecting one of the distribution processing or a normal processing for each of lines in the main scanning direction in the image, the normal processing being a processing of switching nozzles to be used in printing of the image in the overlap portion between the first nozzles of the first inkjet head and the second nozzles of the second inkjet head at a specified position in the main scanning direction; and be configured to select one of the distribution processing or the normal processing for each of the lines in the main scanning direction in the image based on a profile data indicating fluctuation in a conveyance speed of the print medium.

According to the aforementioned configuration, it is possible to reduce ink landing position shifting in the image printed in the overlap portion of the inkjet heads which may be caused by fluctuation in the conveyance speed of the print medium if the distribution processing is performed. As a result, the decrease in the print image quality can be further lessened.

The inkjet printer may further include a detector configured to detect a conveyance speed of the print medium. The controller may be capable of selecting one of the distribution processing or a normal processing for each of lines in the main scanning direction in the image, the normal processing being a processing of switching nozzles to be used in printing of the image in the overlap portion between the first nozzles of the first inkjet head and the second nozzles of the second inkjet head at a specified position in the main scanning direction; and be configured to select one of the distribution processing or the normal processing for each of the lines in the main scanning direction in the image based on an acceleration and a deceleration of the conveyance speed of the print medium detected by the detector.

According to the aforementioned configuration, it is possible to reduce the ink landing position shifting in the image printed in the overlap portion of the inkjet heads which may be caused by fluctuation in the conveyance speed of the print medium if the distribution processing is performed. As a result, the decrease in the print image quality can be further lessened.

BRIEF DESCRIPTION OF DRAWINGS

FIG. 6 is an explanatory view of a front allocation table.

FIG. 7 is an explanatory view of a rear allocation table.

FIG. 8 is an explanatory view of an entire area allocation table.

DESCRIPTION OF EMBODIMENTS

Figure 1:
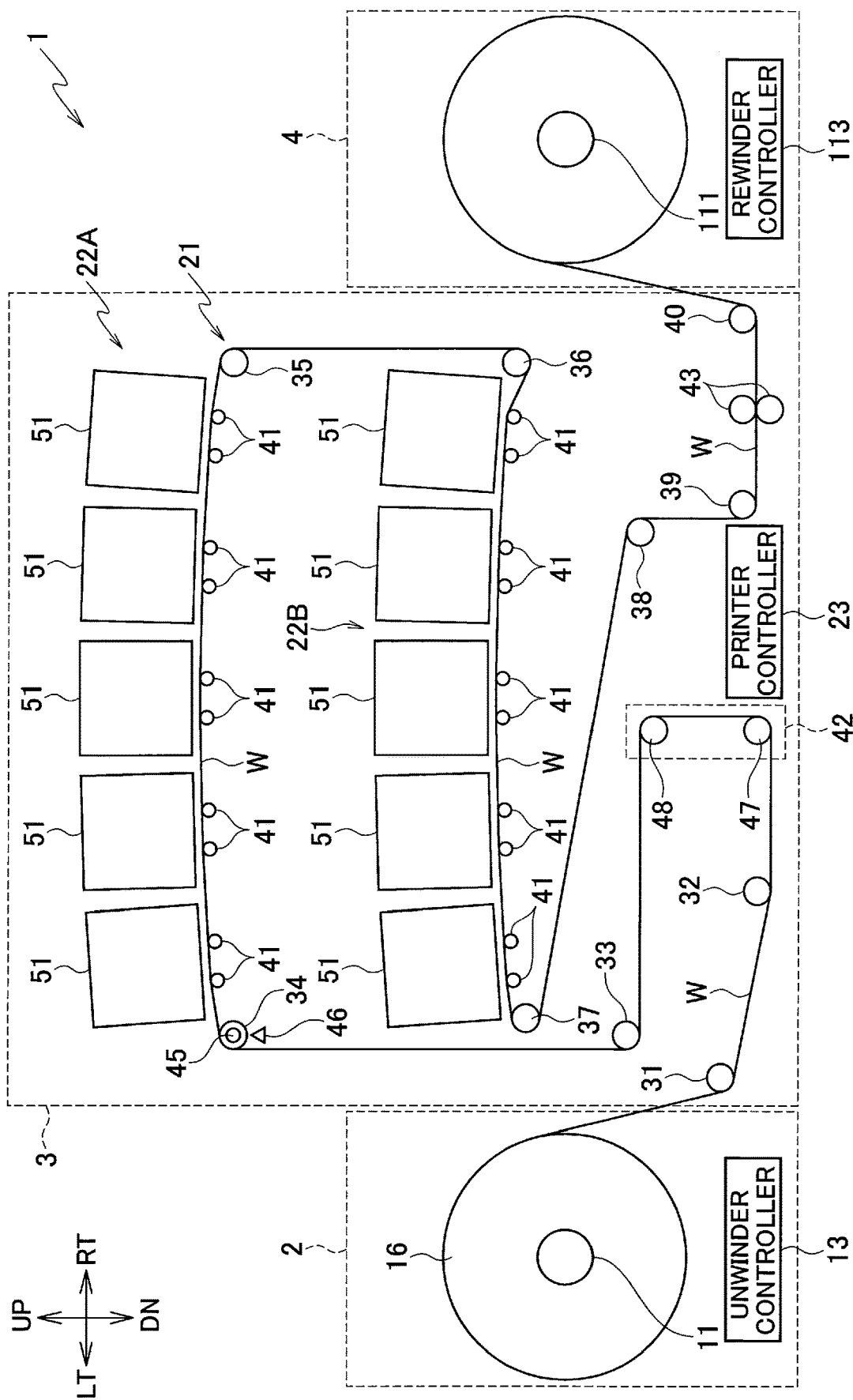
FIG. 1 is a schematic configuration view of a print system including an inkjet printer according to a first embodiment.

Embodiments of the present invention are described below with reference to the drawings. The same or similar parts and components in the drawings are denoted by the same or similar reference numerals.

The embodiments described below are examples of device and the like for embodying the technical idea of the present invention. The technical idea of the present invention does not specify the materials, shapes, structures, arrangements, and the like of the components to those described below. Various changes can be added to the technical idea of the present invention within the scope of claims.

In FIGS. 1 to 3, 10, 13, 17, and 19, directions of right, left, up, down, front, rear, main scanning direction, and sub-scanning direction are denoted by RT, LT, UP, DN, FT, RR, MS, and SS, respectively.

First Embodiment

Figure 2:
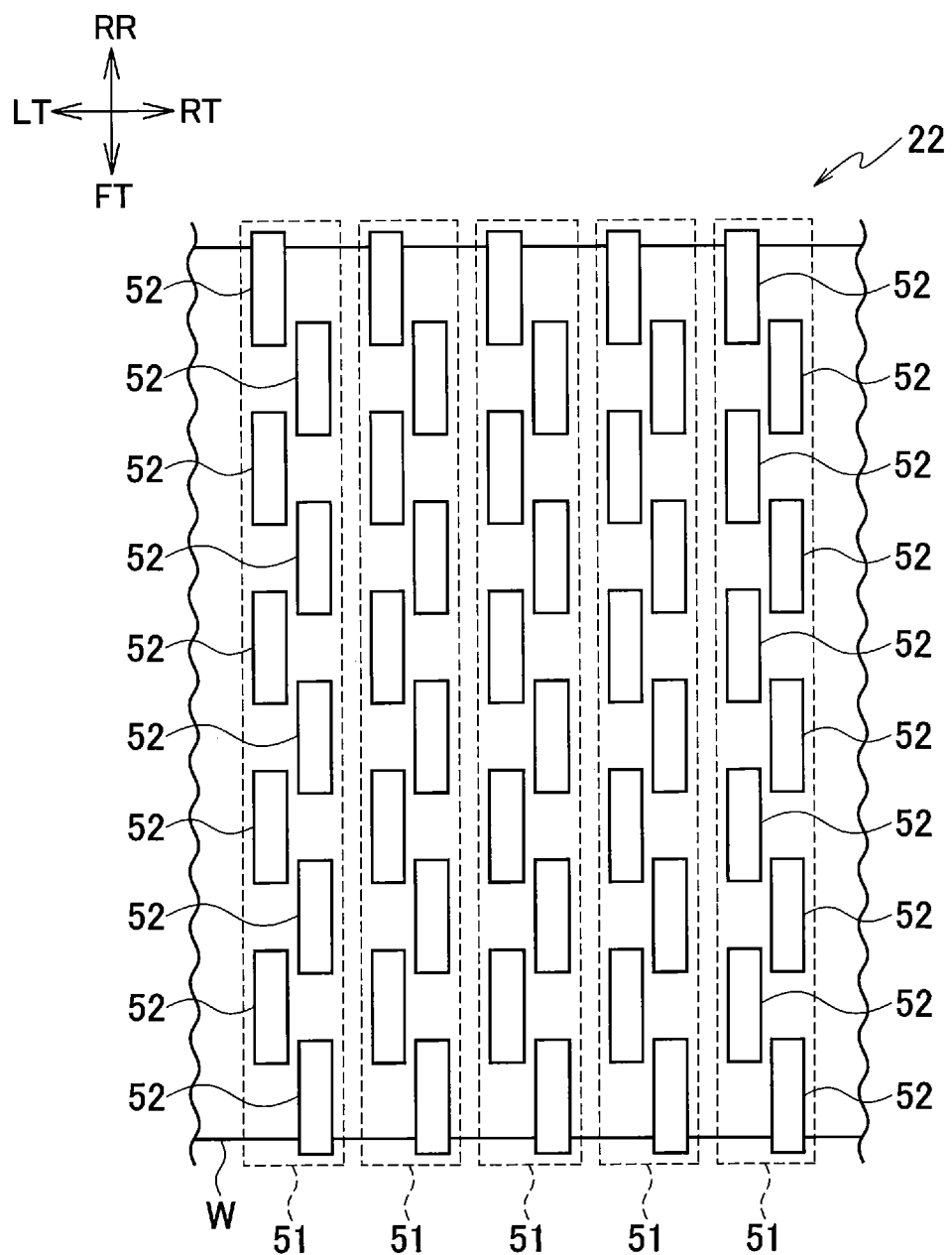
FIG. 2 is a plan view of head units.
Figure 3:
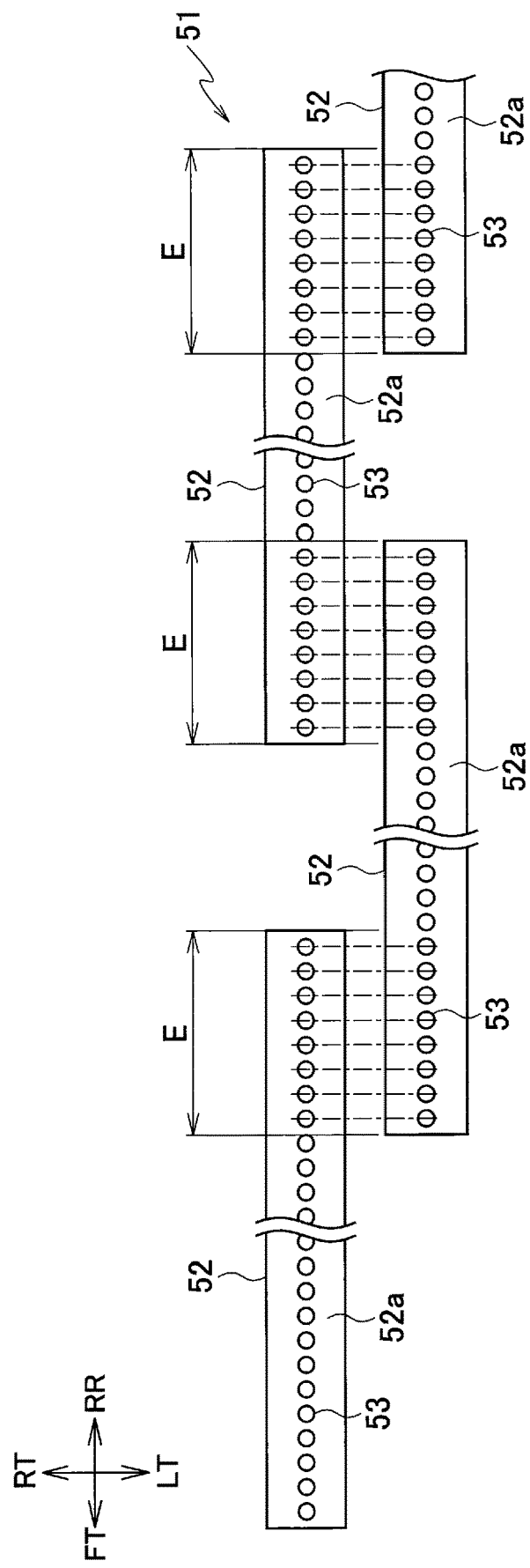
FIG. 3 is a partially enlarged view of the head unit.
Figure 4:
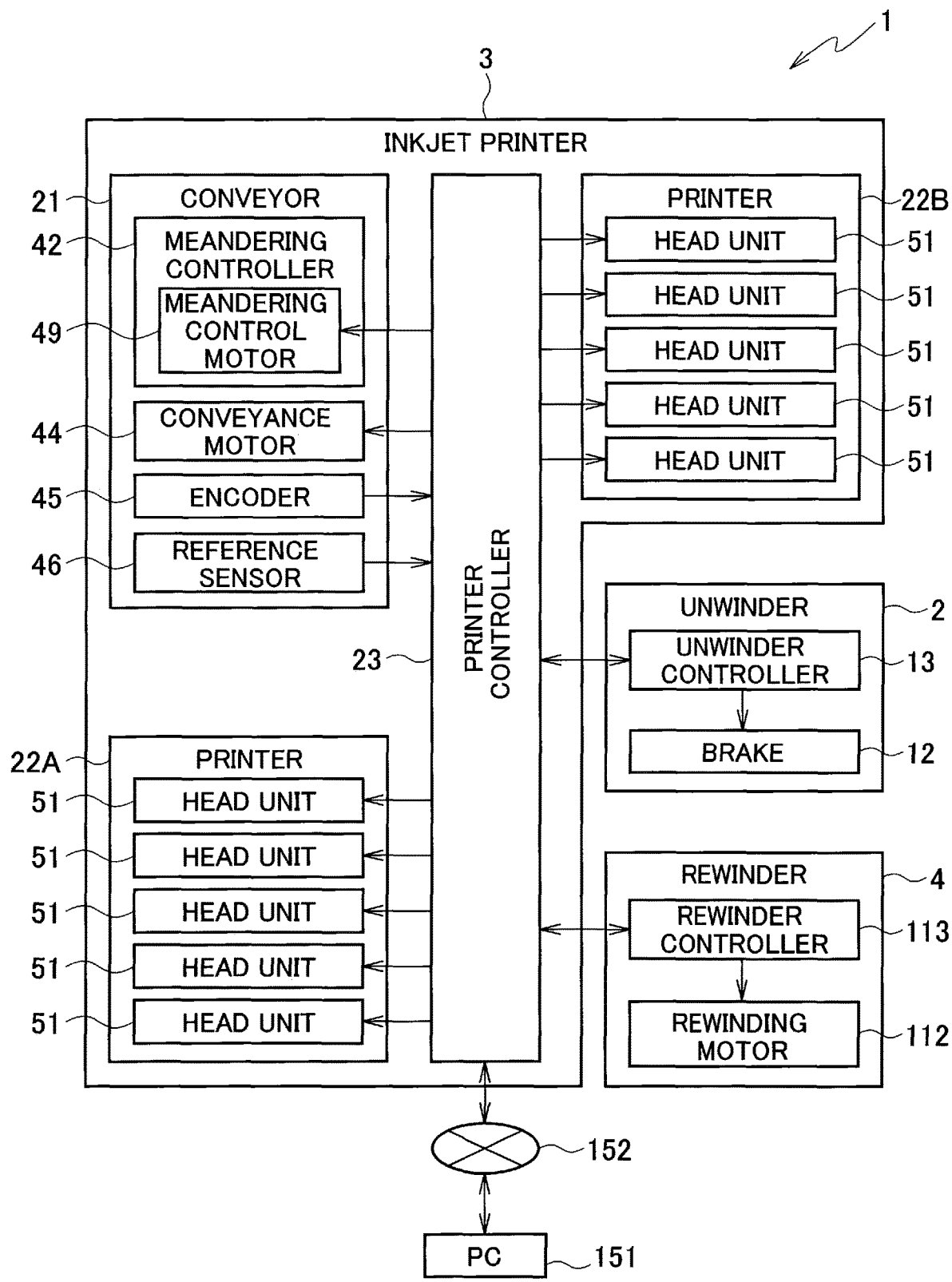
FIG. 4 is a control block diagram of the print system illustrated in FIG. 1.
Figure 5:
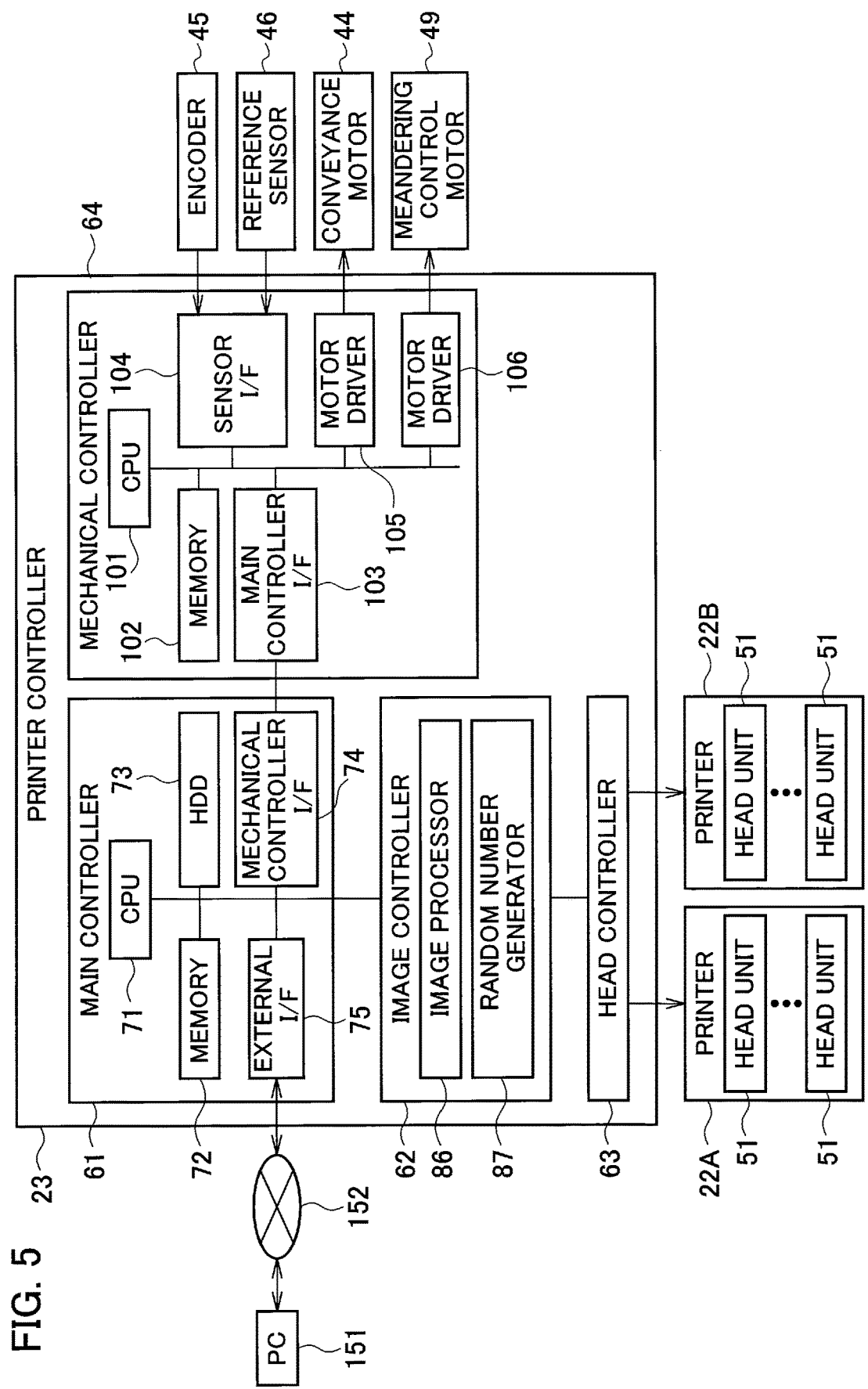
FIG. 5 is a block diagram illustrating a configuration of a printer controller.

FIG. 1 is a schematic configuration view of a print system 1 including an inkjet printer 3 according to a first embodiment of the present invention. FIG. 2 is a plan view of head units 51 in the inkjet printer 3. FIG. 3 is a partially enlarged view of the head unit 51. FIG. 4 is a control block diagram of the print system 1. FIG. 5 is a block diagram illustrating a configuration of a printer controller 23 in the inkjet printer 3. In the following description, a direction orthogonal to the sheet surface of FIG. 1 is referred to as front-rear direction and a direction from the sheet surface toward the viewer is referred to as front. Moreover, up, down, left, and right in the sheet surface of FIG. 1 are referred to as directions of up, down, left, and right.

As illustrated in FIGS. 1 and 4, the print system 1 according to the first embodiment includes an unwinder 2, the inkjet printer 3, and a rewinder 4.

The unwinder 2 unwinds a web W being a long print medium made of film, paper, or the like to the inkjet printer 3. The unwinder 2 includes a web roll support shaft 11, a brake 12, and an unwinder controller 13.

The web roll support shaft 11 rotatably supports a web roll 16. The web roll support shaft 11 is formed in a long shape extending in the front-rear direction. The web roll 16 is the web W wound into a roll.

The brake 12 brakes the web roll support shaft 11. Tension is thereby applied to the web W between the web roll 16 and a pair of conveyance rollers 43 of the inkjet printer 3 to be described later.

The unwinder controller 13 controls the brake 12. The unwinder controller 13 includes a CPU, a memory, a hard disk drive, and the like.

The inkjet printer 3 prints images on the web W while conveying the web W unwound from the unwinder 2. The inkjet printer 3 includes a conveyor 21, printers 22A, 22B, and a printer controller (controller) 23. Note that the printers 22A, 22B and the like are sometimes collectively referred to by omitting the alphabets attached to the reference numerals.

The conveyor 21 conveys the web W unwound from the unwinder 2. The conveyor 21 includes guide rollers 31 to 40, 20 under-head support members 41, a meandering controller 42, the pair of conveyance rollers 43, a conveyance motor 44, an encoder 45, and a reference sensor 46.

The guide rollers 31 to 40 guide the web W conveyed in the inkjet printer 3. The guide rollers 31 to 40 rotate by following the web W being conveyed. The guide rollers 31 to 40 are each formed in a long cylindrical shape extending in the front-rear direction.

The guide rollers 31, 32 guide the web W between the unwinder 2 and the meandering controller 42. The guide roller 31 is arranged in a left end portion of a lower portion of the inkjet printer 3. The guide roller 32 is arranged between the guide roller 31 and a meandering control roller 47 of the meandering controller 42 to be described later.

The guide rollers 33 to 39 guide the web W between the meandering controller 42 and the pair of the conveyance rollers 43. The guide roller 33 is arranged on the left side of a meandering control roller 48 in the meandering controller 42 to be described later. The guide roller 34 is arranged above the guide roller 33. The guide roller 35 is arranged on the right side of the guide roller 34 at substantially the same height as the guide roller 34. The guide roller 36 is arranged below the guide roller 35 and above the guide roller 33. The guide roller 37 is arranged on the left side of the guide roller 36, near and on the right side of the web W between the guide rollers 33, 34, at substantially the same height as the guide roller 36. The guide roller 38 is arranged on the lower right side of the guide roller 37. The guide roller 39 is arranged below and slightly on the right side of the guide roller 38.

The guide roller 40 guides the web W between the pair of conveyance rollers 43 and the rewinder 4. The guide roller 40 is arranged in a right end portion of the lower portion of the inkjet printer 3.

The under-head support members 41 support the web W below later-described head units 51 between the guide rollers 34, 35 and between the guide rollers 36, 37. The under-head support members 41 are each formed in a long shape extending in the front-rear direction. Ten under-head support members 41 are arranged in each of an area between the guide rollers 34, 35 and an area between the guide rollers 36, 37. Two under-head support members 41 are arranged directly below each head unit 51. The ten under-head support members 41 in each of the area between the guide rollers 34, 35 and the area between the guide rollers 36, 37 are arranged such that the web W is conveyed in an arch shape protruding upward.

The meandering controller 42 corrects meandering of the web W. The meandering controller 42 includes the meandering control rollers 47, 48 and a meandering control motor 49.

The meandering control rollers 47, 48 are rollers for guiding the web W and correcting the meandering of the web W. The meandering control rollers 47, 48 are each formed in a long cylindrical shape extending in the front-rear direction. The meandering control rollers 47, 48 rotate by following the web W being conveyed. The meandering control rollers 47, 48 are each configured such that an angle of an axial direction thereof with respect to the width direction of the web W (front-rear direction) is adjustable. The meandering control roller 47 is arranged on the right side of the guide roller 32. The meandering control roller 48 is arranged above the meandering control roller 47.

The meandering control motor 49 turns the meandering control rollers 47, 48 about axes parallel to the left-right direction to adjust the angles of the axial directions of the meandering control rollers 47, 48 with respect to the width direction of the web W (front-rear direction).

The pair of conveyance rollers 43 conveys the web W toward the rewinder 4 while nipping the web W. The conveyance rollers 43 are each formed in a long cylindrical shape extending in the front-rear direction. The pair of conveyance rollers 43 is arranged between the guide rollers 39, 40.

The conveyance motor 44 rotationally drives the conveyance rollers 43.

The encoder 45 is connected to the guide roller 34 and outputs a pulse signal every time the guide roller 34 turns a predetermined angle.

The reference sensor 46 detects a reference mark provided on the guide roller 34 and indicating a rotation reference position.

The guide rollers 31 to 40, the conveyance rollers 43, and the meandering control rollers 47, 48 which are rollers rotating in the conveyor 21 have the same diameter. The guide rollers 31 to 40, the conveyance rollers 43, and the meandering control rollers 47, 48 are connected to one another by using a connecting member such as a belt and are configured to rotate in synchronization.

The printers 22A, 22B print images on the front side and the back side of the web W, respectively. The printer 22A is arranged above and near the web W between the guide rollers 34, 35. The printer 22B is arranged above and near the web W between the guide rollers 36, 37. The printers 22A, 22B each include five head units 51.

The head units 51 print images by ejecting inks to the web W. In each printer 22, the five head units 51 eject inks of different colors, respectively. Each head unit 51 includes multiple inkjet heads 52. In the embodiment, as illustrated in FIG. 2, each head unit 51 includes ten inkjet heads 52.

As illustrated in FIG. 3, each inkjet head 52 has multiple nozzles 53 which are opened on a nozzle surface 52a facing the web W and from which the ink is ejected. The nozzles 53 are arranged in the main scanning direction (front-rear direction) at a predetermined pitch.

In each head unit 51, the ten inkjet heads 52 are arranged in the main scanning direction while zigzagging. Specifically, the ten inkjet heads 52 are arranged in the main scanning direction (front-rear direction) with the position of every other inkjet head 52 shifted in the sub-scanning direction (left-right direction) which is the conveyance direction of the web W. In this configuration, the inkjet heads 52 are arranged such that the inkjet heads 52 adjacent each other in the main scanning direction partially overlap each other in the main scanning direction. Specifically, each head unit 51 has overlap portions E in which the inkjet heads 52 overlap one another in the main scanning direction, at seam portions of the inkjet heads 52 in the main scanning direction.

The inkjet heads 52 sharing the same overlap portion E are arranged such that the positions of the nozzles 53 in one inkjet head (first inkjet head) 52 match the positions of the nozzles 53 in another inkjet head (second inkjet head) 52 in the main scanning direction.

The printer controller 23 controls operations of various parts of the inkjet printer 3. As illustrated in FIG. 5, the printer controller 23 includes a main controller 61, an image controller 62, ahead controller 63, and a mechanical controller 64.

The main controller 61 is responsible for control of the entire inkjet printer 3. The main controller 61 includes a CPU (Central Processing Unit) 71, a memory 72, an HDD (Hard Disk Drive) 73, a mechanical controller I/F (interface) 74, and an external I/F 75.

The CPU 71 executes various types of computation processing. When the CPU 71 receives a print job from an external PC (personal computer) 151, the CPU 71 expands compressed image data included in the print job. The image data is drop data indicating the number of drops (gray level value) of ink for each pixel.

The memory 72 is used as a work area of the CPU 71 and the image controller 62.

The HDD 73 stores various programs. The HDD 73 stores a front allocation table 81 illustrated in FIG. 6, a rear allocation table 82 illustrated in FIG. 7, and an entire area allocation table 83 illustrated in FIG. 8.

The front allocation table 81, the rear allocation table 82, and the entire area allocation table 83 are used in distribution processing to be described later. The front allocation table 81 and the rear allocation table 82 are used when intensity of the distribution processing is set to "low." The entire area allocation table 83 is used when the intensity of the distribution processing is set to "high." The contents of the front allocation table 81, the rear allocation table 82, and the entire area allocation table 83 are described later.

The HDD 73 stores conveyance profile data. The conveyance profile data is profile data indicating fluctuation in the conveyance speed of the web W caused by off-centering of the rollers rotating in the conveyor 21 such as the conveyance rollers 43.

As described above, the rollers rotating in the conveyor 21 have the same diameter and are configured to rotate in synchronization by the connection member. Accordingly, the fluctuation in the conveyance speed of the web W caused by the off-centering of the rollers rotating in the conveyor 21 have periodicity of one revolution of the rollers. The conveyance profile data indicates such fluctuation (pulse) in the conveyance speed of the web W in one revolution of the rollers rotating the conveyor 21.

The conveyance profile data indicates the fluctuation in the conveyance speed of the web W in one revolution of the rollers rotating in the conveyor 21 from a timing at which the reference sensor 46 detects the reference mark on the guide roller 34. The conveyance profile data is generated in advance by measuring the conveyance speed of the web W in the inkjet printer 3.

The mechanical controller I/F 74 connects the mechanical controller 64 to the main controller 61. The external I/F 75 connects the main controller 61 to a network 152. The main controller 61 can thereby exchange data with an external device such as the PC 151 via the network 152.

The main controller 61 is capable of communicating with the unwinder controller 13 and a rewinder controller 113 via a not-illustrated communication line and outputs instructions such as start and stop of conveyance of the web W to the unwinder controller 13 and the rewinder controller 113.

The image controller 62 divides image data of each color into pieces of image data for the respective inkjet heads 52 and outputs the pieces of image data to the head controller 63. The image controller 62 includes an image processor 86 and a random number generator 87.

The image processor 86 divides the image data of each color into the pieces of image data for the respective inkjet heads 52. The image processor 86 executes the distribution processing when the distribution processing is enabled. The distribution processing is processing in which the number of ink drops for each pixel in the image to be printed in each overlap portion E of the inkjet heads 52 is distributed based on a random number between the nozzle 53 for the pixel in one of the inkjet heads 52 and the nozzle 53 in the other inkjet head 52 overlapping the nozzle 53 in the one inkjet head 52. Allocation processing of "low" intensity and distribution processing of "high" intensity can be selected as the distribution processing. Details of the distribution processing are described later.

The random number generator 87 generates a random number (pseudorandom number). The random number generated by the random number generator 87 is used in the distribution processing performed by the image processor 86.

Figure 9:
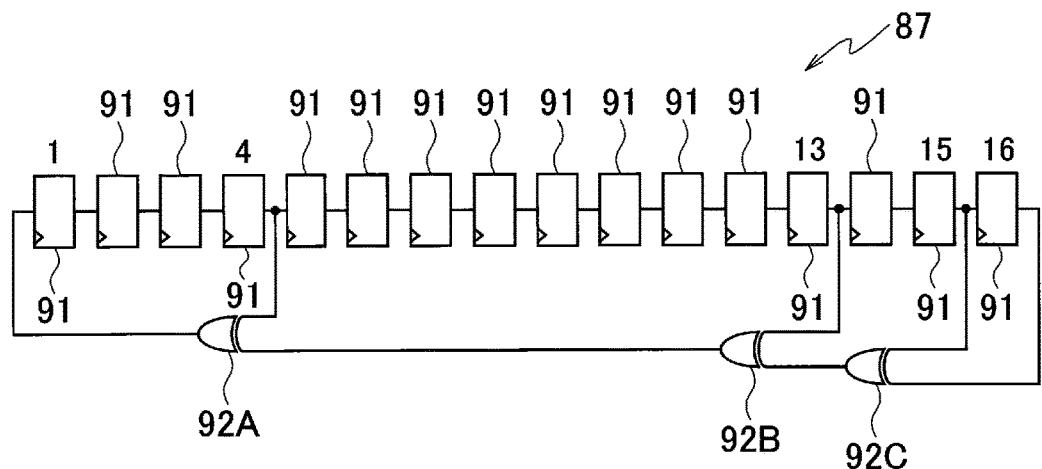
FIG. 9 is a view illustrating a configuration example of a random number generator.

In the embodiment, the random number generator 87 is formed of a general linear feedback shift register as illustrated in FIG. 9. The random number generator 87 has a structure in which 16 shift registers 91 are connected in series and outputs of the shift registers 91 in the fourth, thirteenth, fifteenth, and sixteenth stages are fed back to the first shift register 91 via exclusive or circuits 92A to 92C. A pseudorandom number sequence with a cycle long enough that the numbers therein can be considered as pseudorandom numbers are obtained by exclusive or calculation performed in this feedback.

In this configuration, the more the number of the shift registers 91 is, the longer the generation cycle of the pseudorandom numbers generated by the linear feedback shift register forming the random number generator 87 is. When the generation cycle of the pseudorandom numbers is too short, the cycle of the pseudorandom numbers appears as a pattern in the image printed by performing the distribution processing. Accordingly, the random number generator 87 needs to be configured to produce pseudorandom numbers with a sufficiently long generation cycle. How long the generation cycle of the pseudorandom numbers needs to be is determined based on, for example, experimental print results.

The head controller 63 drives the inkjet heads 52 to cause them to eject the inks based on the pieces of image data for the respective inkjet heads 52 received from the image controller 62.

The mechanical controller 64 controls the conveyance of the web W by the conveyor 21. The mechanical controller 64 includes a CPU 101, a memory 102, a main controller I/F 103, a sensor I/F 104 and motor drivers 105, 106.

The CPU 101 executes various types of computation processing. The memory 102 is used as a work area of the CPU 101. The main controller I/F 103 connects the mechanical controller 64 to the main controller 61. The sensor I/F 104 connects the encoder 45 and the reference sensor 46 to the mechanical controller 64. The motor drivers 105, 106 drive the conveyance motor 44 and the meandering control motor 49, respectively.

The rewinder 4 rewinds the web W subjected to printing in the inkjet printer 3. The rewinder 4 includes a rewinding shaft 111, a rewinding motor 112, and the rewinder controller 113.

The rewinding shaft 111 rewinds and holds the web W. The rewinding shaft 111 is formed in a long shape extending in the front-rear direction.

The rewinding motor 112 rotates the rewinding shaft 111 clockwise in FIG. 1. Rotation of the rewinding shaft 111 causes the web W to be rewound on the rewinding shaft 111.

The rewinder controller 113 controls drive of the rewinding motor 112. The rewinder controller 113 includes a CPU, a memory, a hard disk drive, and the like.

Next, a print operation in the print system 1 is described.

When the printing is to be performed in the print system 1, the PC 151 sends the print job to the inkjet printer 3 in response to a user operation.

In this case, the user performs an operation of enabling or disabling the distribution processing in the printing based on the print job, on a printer driver of the PC 151. Moreover, when the distribution processing is enabled, the user performs an operation of setting the intensity of the distribution processing to "low" or "high." For example, the user enables or disables the distribution processing and sets the intensity of the distribution processing in the case where the distribution processing is to be performed, based on the experimental print results of the image to be printed in the print job. The print job includes distribution setting information which is set by the user and which indicates whether the distribution processing is enabled or disabled and the intensity of the distribution processing in the case where the distribution processing is to be performed.

When receiving the print job, the CPU 71 of the main controller 61 instructs the mechanical controller 64, the unwinder controller 13, and the rewinder controller 113 to start the conveyance of the web W. The drive of the conveyance rollers 43 and the rewinder 4 is thereby started and the conveyance of the web W is started. When the conveyance of the web W is started and then the conveyance speed of the web W reaches predetermined print conveyance speed, the drive of the brake 12 is started. Hereafter, the conveyance speed of the web W is maintained at the print conveyance speed during the execution of the print job.

Moreover, when receiving the print job, the CPU 71 of the main controller 61 expands the compressed image data of each color included in the print job and sends the expanded image data to the image processor 86. Furthermore, the CPU 71 sends the distribution setting information included in the print job to the image processor 86.

The image processor 86 stores the setting of whether the distribution processing is enabled or disabled and the setting of the intensity of the distribution processing in the case where the distribution processing is to be performed, in a register (not illustrated) based on the distribution setting information.

Then, the image processor 86 divides the image data for each color into the pieces of image data for the respective inkjet heads 52 in the head unit 51 for this color and outputs the pieces of image data to the head controller 63. In this case, the image processor 86 performs normal processing to be described later or the distribution processing as processing performed on image data of a range corresponding to each overlap portion E when the image data is divided into the pieces of image data for the respective inkjet heads 52. The image processor 86 performs the normal processing when the distribution processing is disabled and performs "low" or "high" distribution processing depending on the set intensity when the distribution processing is enabled. However, as described later, the image processor 86 switches to the normal processing in a normal processing period in the case where the distribution processing is enabled.

The head controller 63 drives the inkjet heads 52 and causes them to eject the ink based on the pieces of image data for the respective inkjet heads 52 received from the image processor 86. An image is thereby printed on the web W.

Next, the aforementioned normal processing is described.

The normal processing is processing in which the nozzles 53 to be used in printing of image in each overlap portion E are switched, at a specified position in the main scanning direction, between the nozzles 53 in one of the inkjet heads 52 and the overlapping nozzles 53 in the other inkjet head 52 in the overlap portion E.

Specifically, for example, the nozzles 53 to be used are switched between the nozzles 53 in the one inkjet head 52 and the overlapping nozzles 53 in the other inkjet head 52 in the overlap portion E at an intermediate position of the overlap portion E in the main scanning direction. In this case, when the image processor 86 divides the image data into the pieces of image data for the respective inkjet heads 52, the image processor 86 divides the image data at a position corresponding to the intermediate position of the overlap portion E in the main scanning direction. For example, when the number of pixels corresponding to one overlap portion E in one line in the main scanning direction is eight pixels, the eight pixels are divided into four pixels on the one inkjet head 52 side and four pixels on the other inkjet head 52 side at the intermediate position.

Figure 10:
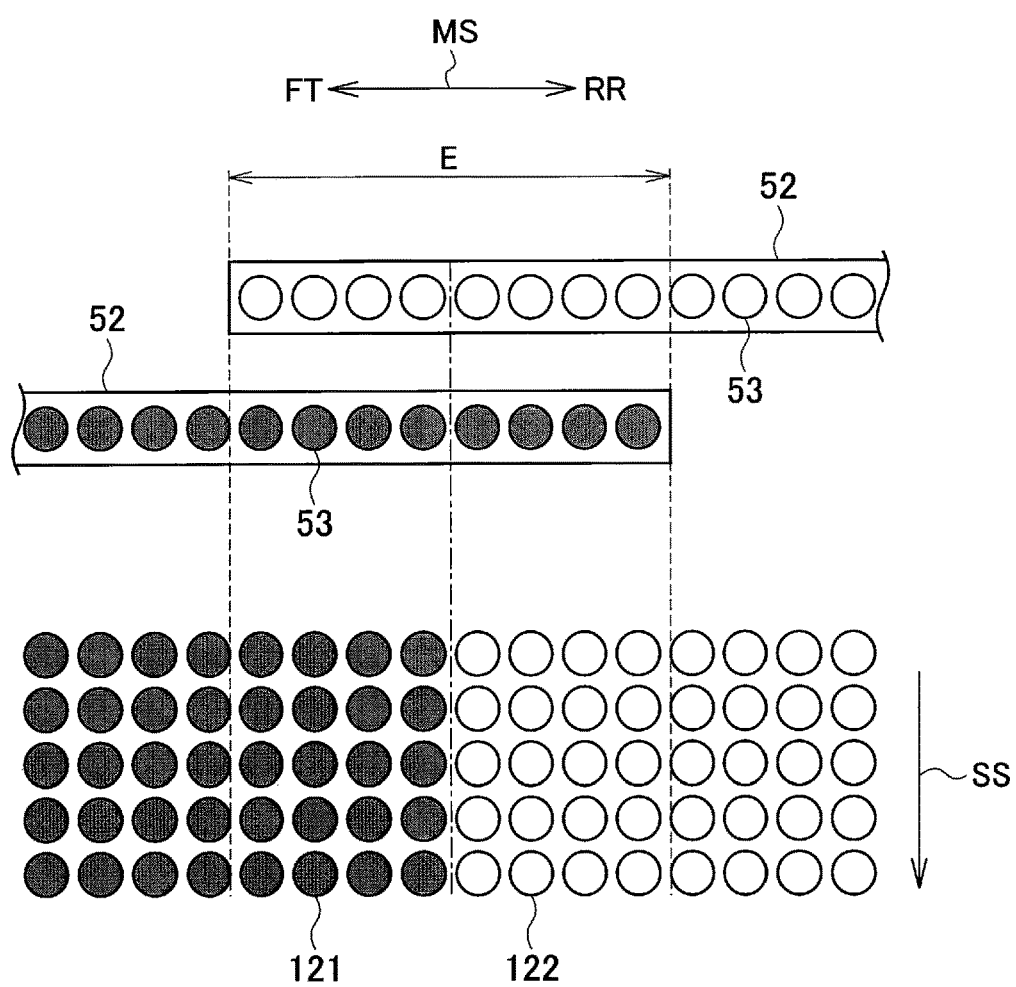
FIG. 10 is a view illustrating an example of a dot image of an image printed in an overlap portion of the inkjet heads when the normal processing is performed.

A dot image of an image printed by the overlap portion E in this case is illustrated in FIG. 10. In FIG. 10, dots 121 are formed by the ink ejected from the nozzles 53 in the front inkjet head 52. Meanwhile, dots 122 are formed by the ink ejected from the nozzles 53 in the rear inkjet head 52. As illustrated in FIG. 10, in the normal processing, the inkjet head 52 to be used in the printing is switched at a specified position (intermediate position in the example of FIG. 10) in the overlap portion E in the main scanning direction.

Next, the aforementioned distribution processing is described.

As described above, the distribution processing is processing in which the number of drops of ink for each pixel in the image to be printed in the overlap portion E is distributed based on the random number between the nozzle 53 in one of the inkjet heads 52 and the overlapping nozzle 53 in the other inkjet head 52. The distribution processing includes the distribution processing of "low" intensity and the distribution processing of "high" intensity.

In the aforementioned normal processing, a density difference in the printed image caused by differences in ejection characteristics between the inkjet heads 52 tends to appear at a position where the inkjet head 52 used in the printing is switched in the overlap portion E. As a result, color unevenness tends to occur in the image printed in the overlap portion E. The distribution processing is processing of reducing such color unevenness.

First, the distribution processing of "low" intensity is described.

In the distribution processing of "low" intensity, a priority of distribution of the number of drops to one of the inkjet heads 52 and that to the other inkjet head 52 are changed by degrees in the main scanning direction in the overlap portion E.

In the embodiment, the priority of distribution of the number of drops to the one inkjet head 52 and that to the other inkjet head 52 in the overlap portion E are each assumed to be changed in two steps.

Specifically, in a front area Af among the front area Af and a rear area Ar (see FIG. 13) obtained by dividing a print area of the overlap portion E into two areas in the front-rear direction, the priority of distribution of the number of drops to the front inkjet head 52 is set higher than that to the rear inkjet head 52. Meanwhile, in the rear area Ar, the priority of distribution of the number of drops to the rear inkjet head 52 is set higher than that to the front inkjet head 52.

More specifically, for each of the pixels in the front area Af, the number of drops is distributed by using the front allocation table 81 in FIG. 6. For each of the pixels in the rear area Ar, the number of drops is distributed by using the rear allocation table 82 in FIG. 7. The front allocation table 81 is a table in which the number of drops in the image data of a pixel forming an image of the front area Af, the random number, and the number of drops to be allocated to each of the front inkjet head 52 and the rear inkjet head 52 are associated with one another. The rear allocation table 82 is a table in which the number of drops in the image data of a pixel forming an image of the rear area Ar, the random number, and the number of drops to be allocated to each of the front inkjet head 52 and the rear inkjet head 52 are associated with one another. In this example, the maximum number of drops per pixel is assumed to be three drops.

As illustrated in FIG. 6, when the number of drops for a pixel in the front area Af is 1, one drop is allocated to the front inkjet head 52. When the number of drops for a pixel in the front area Af is 2, one drop is allocated to each of the front inkjet head 52 and the rear inkjet head 52 or two drops are allocated to the front inkjet head 52. When the number of drops for a pixel in the front area Af is 3, two drops and one drop are allocated to the front inkjet head 52 and the rear inkjet head 52, respectively, or three drops are allocated to the front inkjet head 52.

As described above, in the front area Af, a greater number of drops tend to be distributed to the front inkjet head 52 than to the rear inkjet head 52. In other words, in the front area Af, the priority of distributing drops to the front inkjet head 52 is higher than that to the rear inkjet head 52.

The rear allocation table 82 of FIG. 7 is a table in which the number of drops to be allocated to the front inkjet head 52 and the number of drops to be allocated to the rear inkjet head 52 are reversed from those in the front allocation table 81 of FIG. 6.

Accordingly, in the rear area Ar, a greater number of drops tend to be distributed to the rear inkjet head 52 than to the front inkjet head 52. In other words, in the rear area Ar, the priority of distributing drops to the rear inkjet head 52 is higher than that to the front inkjet head 52.

In the distribution processing of "low" intensity, the image processor 86 obtains a one-bit random number value from the random number generator 87 for each line in the main scanning direction. Then, the image processor 86 uses the obtained random number value and refers to the front allocation table 81 and the rear allocation table 82 to determine the number of drops to be distributed to each of the front inkjet head 52 and the rear inkjet head 52 for each of pixels to be printed in the overlap portion E.

A process of determining the number of drops to be distributed to each of the front inkjet head 52 and the rear inkjet head 52 in the distribution processing of "low" intensity is described separately for processing for a pixel in the front area Af and processing for a pixel in the rear area Ar.

Figure 11:
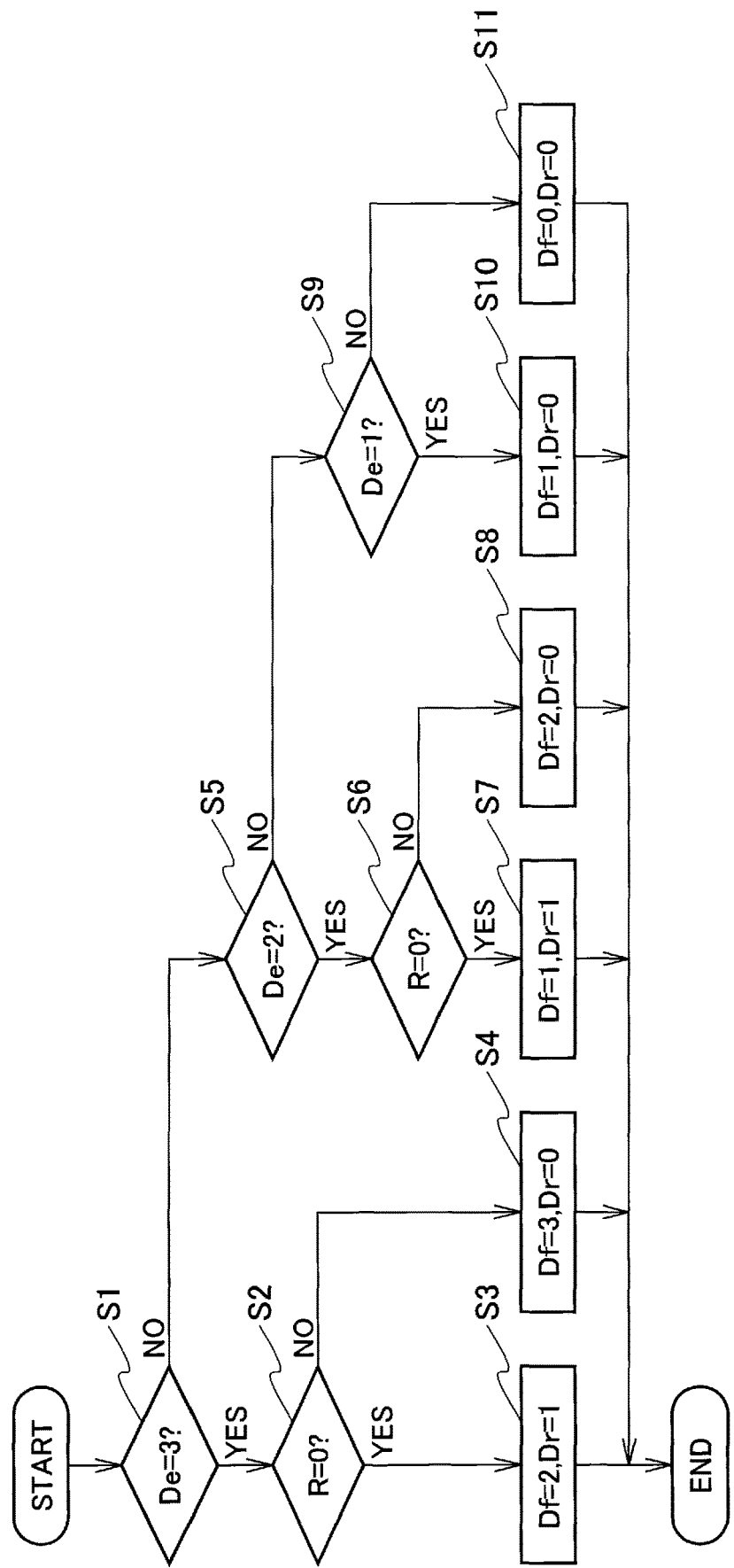
FIG. 11 is a flowchart for explaining a process of determining the number of drops for each of a front inkjet head and a rear inkjet head in the case where the number of drops for each pixel in a front area is distributed between the front inkjet head and the rear inkjet head in distribution processing of "low" intensity.

FIG. 11 is a flowchart for explaining the process of determining the number of drops for each of the front inkjet head 52 and the rear inkjet head 52 when the number of drops for a pixel in the front area Af is to be distributed between the front inkjet head 52 and the rear inkjet head 52 in the distribution processing of "low" intensity. The processing of the flowchart of FIG. 11 is processing for one pixel and this processing is performed for each of the pixels in the front area Af.

In step S1 of FIG. 11, the image processor 86 determines whether the number of drops De in the image data of a pixel to be processed is 3 or not.

When determining that De is 3 (step S1: YES), in step S2, the image processor 86 determines whether the random number value R for the line in which the pixel to be processed belongs is 0 or not.

When determining that R is 0 (step S2: YES), in step S3, the image processor 86 refers to the front allocation table 81 and determines that the number of drops Df for the front inkjet head 52 is 2 and the number of drops Dr for the rear inkjet head 52 is 1.

When determining that R is not 0, that is R is 1 in step S2 (step S2: NO), in step S4, the image processor 86 refers to the front allocation table 81 and determines that Df is 3 and Dr is 0.

When determining that De is not 3 in step S1 (step S2: NO), in step S5, the image processor 86 determines whether De is 2 or not.

When determining that De is 2 (step S5: YES), in step S6, the image processor 86 determines whether R is 0 or not.

When determining that R is 0 (step S6: YES), in step S7, the image processor 86 refers to the front allocation table 81 and determines that Df is 1 and Dr is 1.

When determining that R is not 0, that is R is 1 in step S6 (step S6: NO), in step S8, the image processor 86 refers to the front allocation table 81 and determines that Df is 2 and Dr is 0.

When determining that De is not 2 in step S5 (step S5: NO), in step S9, the image processor 86 determines whether De is 1 or not.

When determining that De is 1 (step S9: YES), in step S10, the image processor 86 refers to the front allocation table 81 and determines that Df is 1 and Dr is 0.

When determining that De is not 1, that is De is 0 in step S9 (step S9: NO), in step S11, the image processor 86 determines that Df is 0 and Dr is 0.

When the number of drops Df to be distributed to the front inkjet head 52 and the number of drops Dr to be distributed to the rear inkjet head 52 are determined in one of steps S3, S4, S7, S8, S10, S11, a series of processes is terminated.

Figure 12:
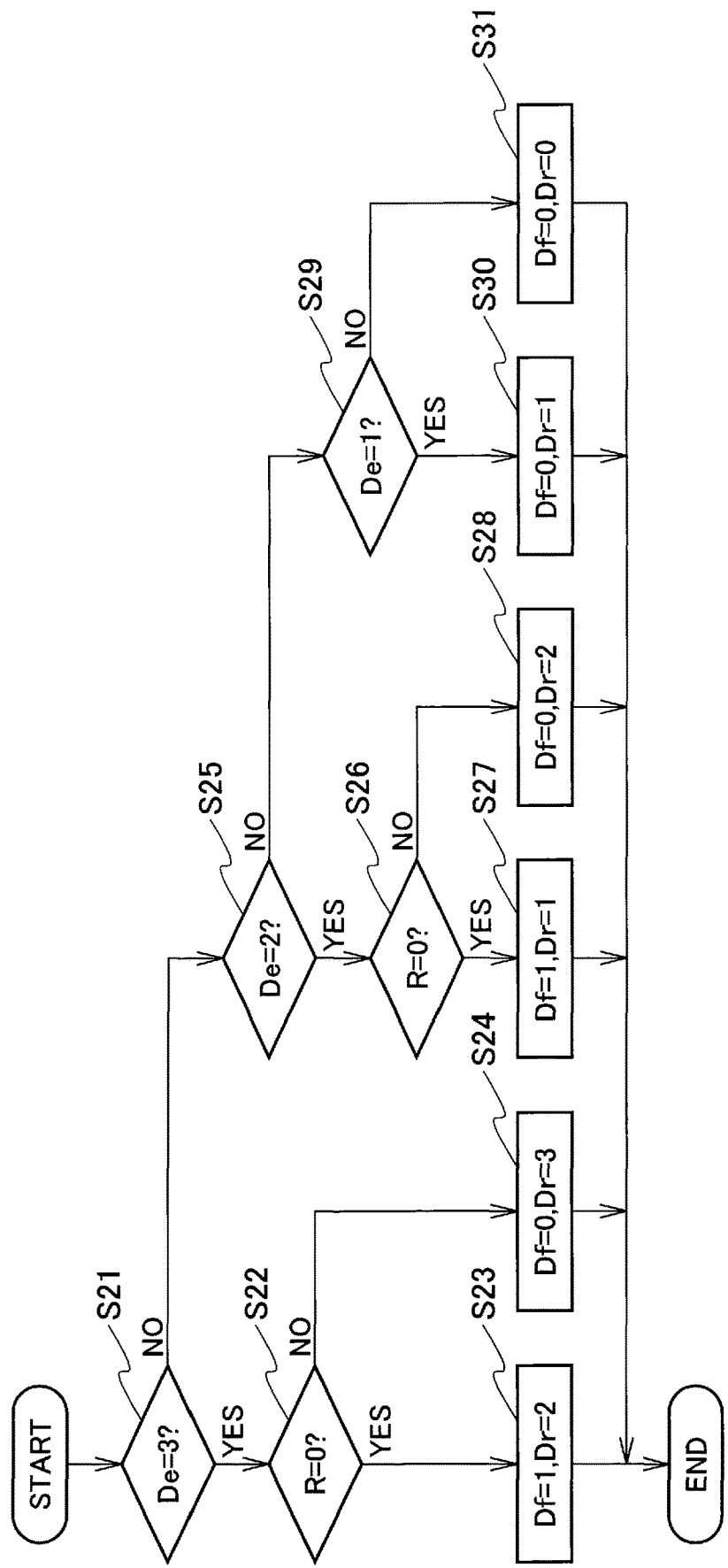
FIG. 12 is a flowchart for explaining a process of determining the number of drops for each of the front inkjet head and the rear inkjet head in the case where the number of drops for each pixel in a rear area is distributed between the front inkjet head and the rear inkjet head in the distribution processing of "low" intensity.

FIG. 12 is a flowchart for explaining the process of determining the number of drops for each of the front inkjet head 52 and the rear inkjet head 52 when the number of drops for a pixel in the rear area Ar is to be distributed between the front inkjet head 52 and the rear inkjet head 52 in the distribution processing of "low" intensity. The processing of the flowchart of FIG. 12 is processing for one pixel as in the processing of FIG. 11 and this processing is performed for each of the pixels in the rear area Ar.

Processing in steps S21 and S22 in FIG. 12 is the same as the processing in steps S1 and S2 in FIG. 11 described above.

When determining that R is 0 in step S22 (step S22: YES), in step S23, the image processor 86 refers to the rear allocation table 82 and determines that Df is 1 and Dr is 2.

When determining that R is not 0, that is R is 1 in step S22 (step S22: NO), in step S24, the image processor 86 refers to the rear allocation table 82 and determines that Df is 0 and Dr is 3.

When determining that De is not 3 in step S21 (step S21: NO), in step S25, the image processor 86 determines whether De is 2 or not.

When determining that De is 2 (step S25: YES), in step S26, the image processor 86 determines whether R is 0 or not.

When determining that R is 0 (step S26: YES), in step S27, the image processor 86 refers to the rear allocation table 82 and determines that Df is 1 and Dr is 1.

When determining that R is not 0, that is R is 1 in step S26 (step S26: NO), in step S28, the image processor 86 refers to the rear allocation table 82 and determines that Df is 0 and Dr is 2.

When determining that De is not 2 in step S25 (step S25: NO), in step S29, the image processor 86 determines whether De is 1 or not.

When determining that De is 1 (step S29: YES), in step S30, the image processor 86 refers to the rear allocation table 82 and determines that Df is 0 and Dr is 1.

When determining that De is not 1, that is De is 0 in step S29 (step S29: NO), in step S31, the image processor 86 determines that Df is 0 and Dr is 0.

When the number of drops Df to be distributed to the front inkjet head 52 and the number of drops Dr to be distributed to the rear inkjet head 52 are determined in one of steps S23, S24, S27, S28, S30, S31, a series of processes is terminated.

Figure 13:
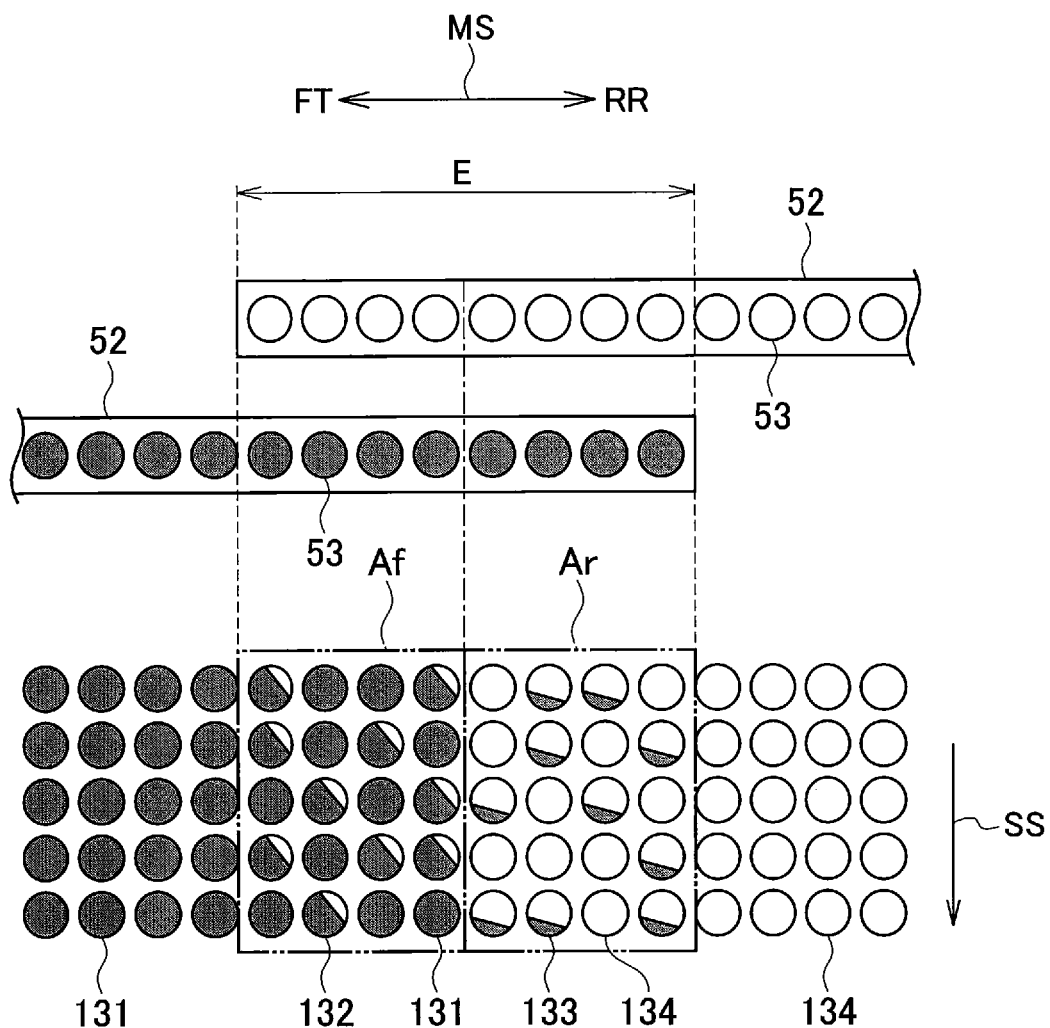
FIG. 13 is a view illustrating an example of a dot image of an image printed in the overlap portion of the inkjet heads when the distribution processing of "low" intensity is performed.

FIG. 13 illustrates a dot image of an image printed in the overlap portion E when the distribution processing of "low" intensity as described above is performed. In the example of FIG. 13, the number of drops for each pixel in the image data is assumed to be 3.

In FIG. 13, each of dots 131 is formed by three drops of ink ejected from the nozzle 53 of the front inkjet head 52. Each of dots 132 is formed by two drops of ink ejected from the nozzle 53 in the front inkjet head 52 and one drop of ink ejected from the nozzle 53 in the rear inkjet head 52. Each of dots 133 is formed by one drop of ink ejected from the nozzle 53 of the front inkjet head 52 and two drops of ink ejected from the nozzle 53 in the rear inkjet head 52. Each of dots 134 is formed by three drops of ink ejected from the nozzle 53 in the rear inkjet head 52.

An image is formed by the dots 131, 132 in the front area Af and an image is formed by the dots 133, 134 in the rear area Ar. In the inkjet heads 52 adjacent to each other in the main scanning direction, the inkjet head 52 to be used in the printing is thus switched by degrees from the front inkjet head 52 to the rear inkjet head 52 across the overlap portion E.

Moreover, the distribution of the number of drops to the front inkjet head 52 and the rear inkjet head 52 by use of random numbers causes the dots 131, 132 to be randomly formed in the front area Af and the dots 133, 134 to be randomly formed in the rear area Ar.

Accordingly, the density difference in the printed image caused by the differences in ejection characteristics between the inkjet heads 52 is less visible than that in the aforementioned normal processing. As a result, the color unevenness in the printed image due to the overlap portion E is reduced.

Next, the distribution processing of "high" intensity is described.

In the distribution processing of "high" intensity, the number of drops of ink for each pixel in the image to be printed is distributed based on the random number between the nozzle 53 in one of the inkjet heads 52 and the overlapping nozzle 53 in the other inkjet head 52 in the entire overlap portion E.

Specifically, in the distribution processing of "high" intensity, the number of drops is distributed by using the entire area allocation table 83 in FIG. 8. The entire area allocation table 83 is a table in which the number of drops in the image data of a pixel in an area to be printed in the overlap portion E, the random number, and the number of drops to be distributed to each of the front inkjet head 52 and the rear inkjet head 52 are associated with one another. As illustrated in FIG. 8, in the entire area allocation table 83, all patterns of distribution of the number of drops in the image data to the two inkjet heads 52 are associated respectively with two-bit random number values.

In the distribution processing of "high" intensity, the image processor 86 obtains the two-bit random number value from the random number generator 87 for each line in the main scanning direction. Then, the image processor 86 uses the obtained random number value and refers to the entire area allocation table 83 to determine the number of drops to be distributed to each of the front inkjet head 52 and the rear inkjet head 52 for each of pixels to be printed in the overlap portion E.

Figure 15:
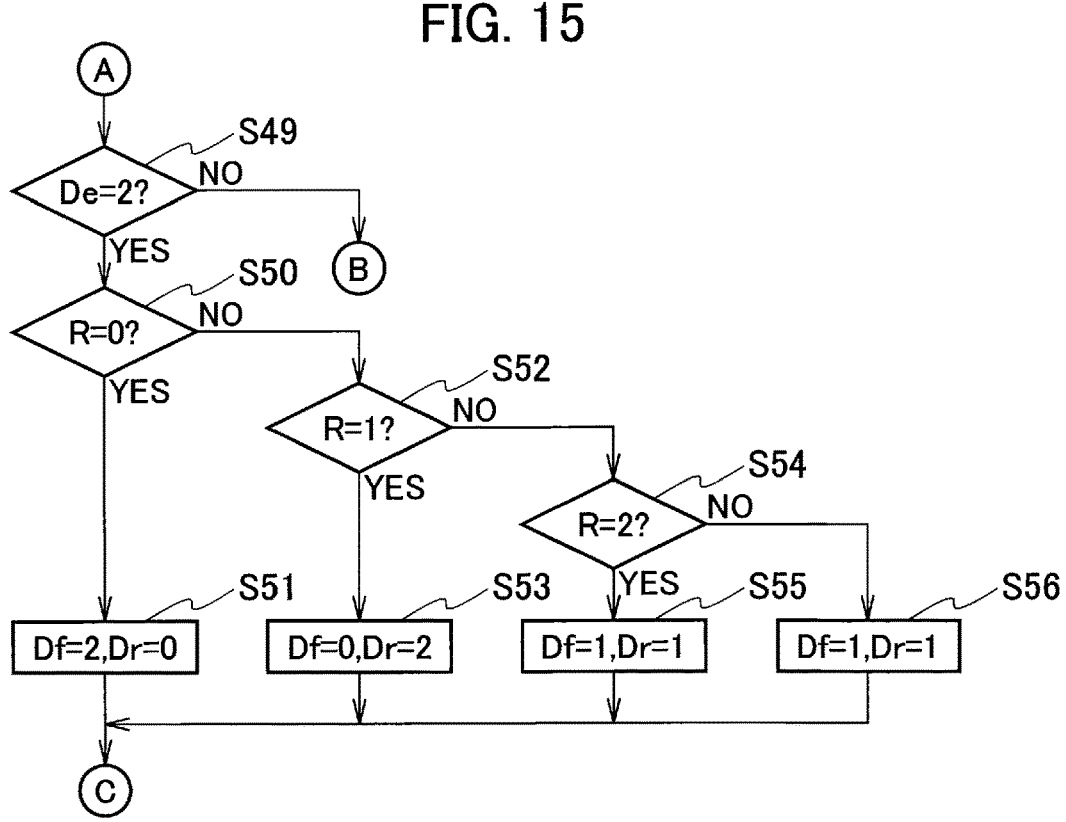
FIG. 15 is a flowchart for explaining the process of determining the number of drops to be distributed to each of the front inkjet head and the rear inkjet head in the distribution processing of "high" intensity.
Figure 16:
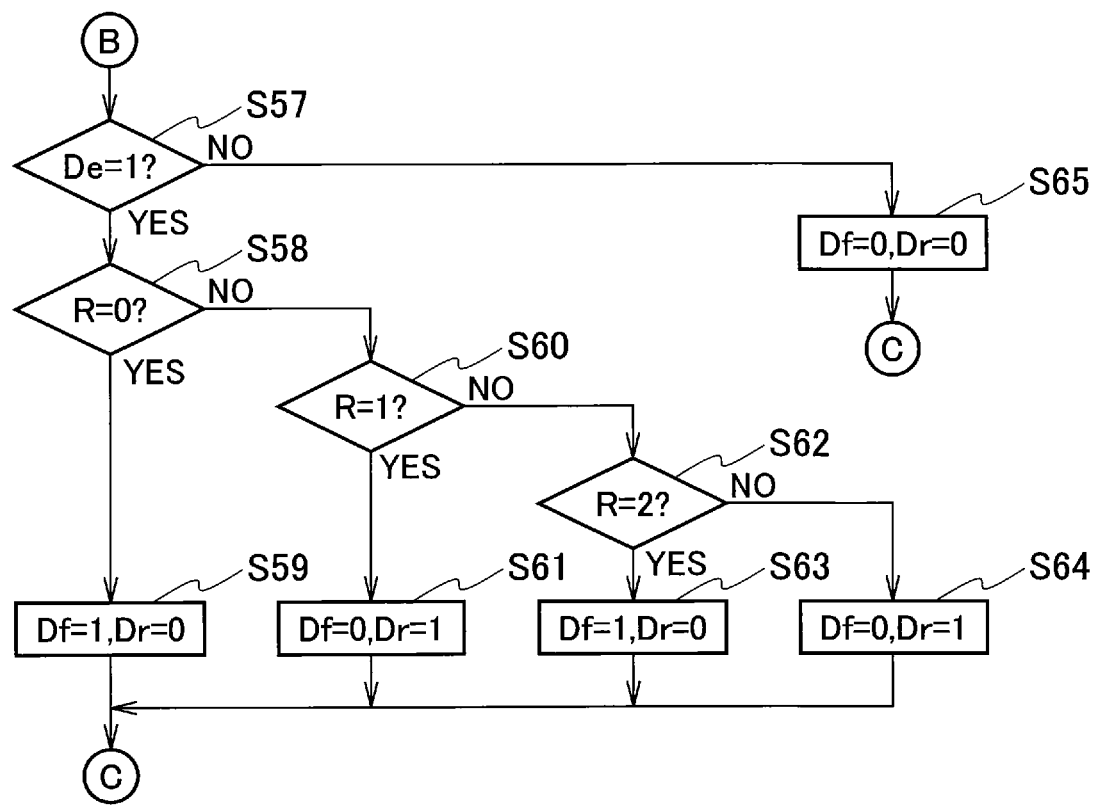
FIG. 16 is a flowchart for explaining the process of determining the number of drops to be distributed to each of the front inkjet head and the rear inkjet head in the distribution processing of "high" intensity.

A process of determining the number of drops to be distributed to each of the front inkjet head 52 and the rear inkjet head 52 in the distribution processing of "high" intensity is described with reference to the flowcharts of FIG. 14 to 16. The processing in the flowcharts of FIGS. 14 to 16 is processing for one pixel and this processing is performed for each of the pixels in the image to be printed in the overlap portion E.

Figure 14:
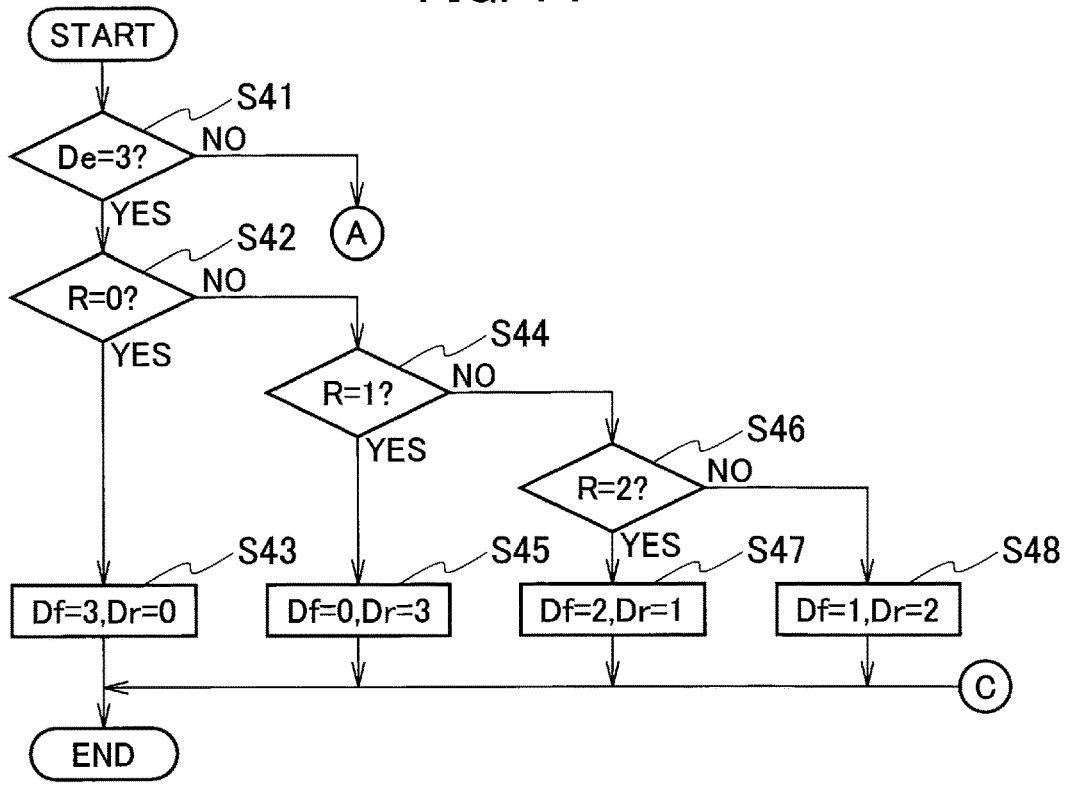
FIG. 14 is a flowchart for explaining a process of determining the number of drops to be distributed to each of the front inkjet head and the rear inkjet head in distribution processing of "high" intensity.

Processing in steps S41, 42 of FIG. 14 is the same as the processing in steps S1, S2 in FIG. 11 described above.

In the distribution processing of "high" intensity, a two-bit random number value "00" obtained by the image processor 86 from the random number generator 87 corresponds to the case where R is 0, "01" corresponds to the case where R is 1, "10" corresponds to the case where R is 2, and "11" corresponds to the case where R is 3.

When determining that R is 0 in step S42 (step S42: YES), in step S43, the image processor 86 refers to the entire area allocation table 83 and determines that Df is 3 and Dr is 0.

When determining that R is not 0 in step S42 (step S42: NO), in step S44, the image processor 86 determines whether R is 1 or not.

When determining that R is 1 (step S44: YES), in step S45, the image processor 86 refers to the entire area allocation table 83 and determines that Df is 0 and Dr is 3.

When determining that R is not 1 in step S44 (step S44: NO), in step S46, the image processor 86 determines whether R is 2 or not.

When determining that R is 2 (step S46: YES), in step S47, the image processor 86 refers to the entire area allocation table 83 and determines that Df is 2 and Dr is 1.

When determining that R is no 2, that is R is 3 (step S46: NO), in step S48, the image processor 86 refers to the entire area allocation table 83 and determines that Df is 1 and Dr is 2.

When determining that De is not 3 in step S41 (step S41: NO), in step S49 of FIG. 15, the image processor 86 determines whether De is 2 or not.

When determining that De is 2 (step S49: YES), in step S50, the image processor 86 determines whether R is 0 or not.

When determining that R is 0 (step S50: YES), in step S51, the image processor 86 refers to the entire area allocation table 83 and determines that Df is 2 and Dr is 0.

When determining that R is not 0 (step S50: NO), in step S52, the image processor 86 determines whether R is 1 or not.

When determining that R is 1 (step S52: YES), in step S53, the image processor 86 refers to the entire area allocation table 83 and determines that Df is 0 and Dr is 2.

When determining that R is not 1 (step S52: NO), in the step S54, the image processor 86 determines whether R is 2 or not.

When determining that R is 2 (step S54: YES), in step S55, the image processor 86 refers to the entire area allocation table 83 and determines that Df is 1 and Dr is 1.

When determining that R is not 2, that is R is 3 (step S54: NO), in step S56, the image processor 86 refers to the entire area allocation table 83 and determines that Df is 1 and Dr is 1.

When determining that De is not 2 in step S49 (step S49: NO), in step S57 of FIG. 16, the image processor 86 determines whether De is 1 or not.

When determining that De is 1 (step S57: YES), in step S58, the image processor 86 determines whether R is 0 or not.

When determining that R is 0 (step S58: YES), in step S59, the image processor 86 refers to the entire area allocation table 83 and determines that Df is 1 and Dr is 0.

When determining that R is not 0 in step S58 (step S58: NO), in step S60, the image processor 86 determines whether R is 1 or not.

When determining that R is 1 (step S60: YES), in step S61, the image processor 86 refers to the entire area allocation table 83 and determines that Df is 0 and Dr is 1.

When determining that R is not 1 (step S60: NO), in step S62, the image processor 86 determines whether R is 2 or not.

When determining that R is 2 (step S62: YES), in step S63, the image processor 86 refers to the entire area allocation table 83 and determines that Df is 1 and Dr is 0.

When determining that R is not 2, that is R is 3 (step S62: NO), in step S64, the image processor 86 refers to the entire area allocation table 83 and determines that Df is 0 and Dr is 1.

When determining that De is not 1, that is, De is 0 in step S57 (step S57: NO), in step S65, the image processor 86 determines that Df is 0 and Dr is 0.

When the number of drops Df to be distributed to the front inkjet head 52 and the number of drops Dr to be distributed to the rear inkjet head 52 are determined in one of steps S43, S45, S47, S48, S51, S53, S55, S56, S59, S61, S63 to S65, a series of processes is terminated.

Figure 17:
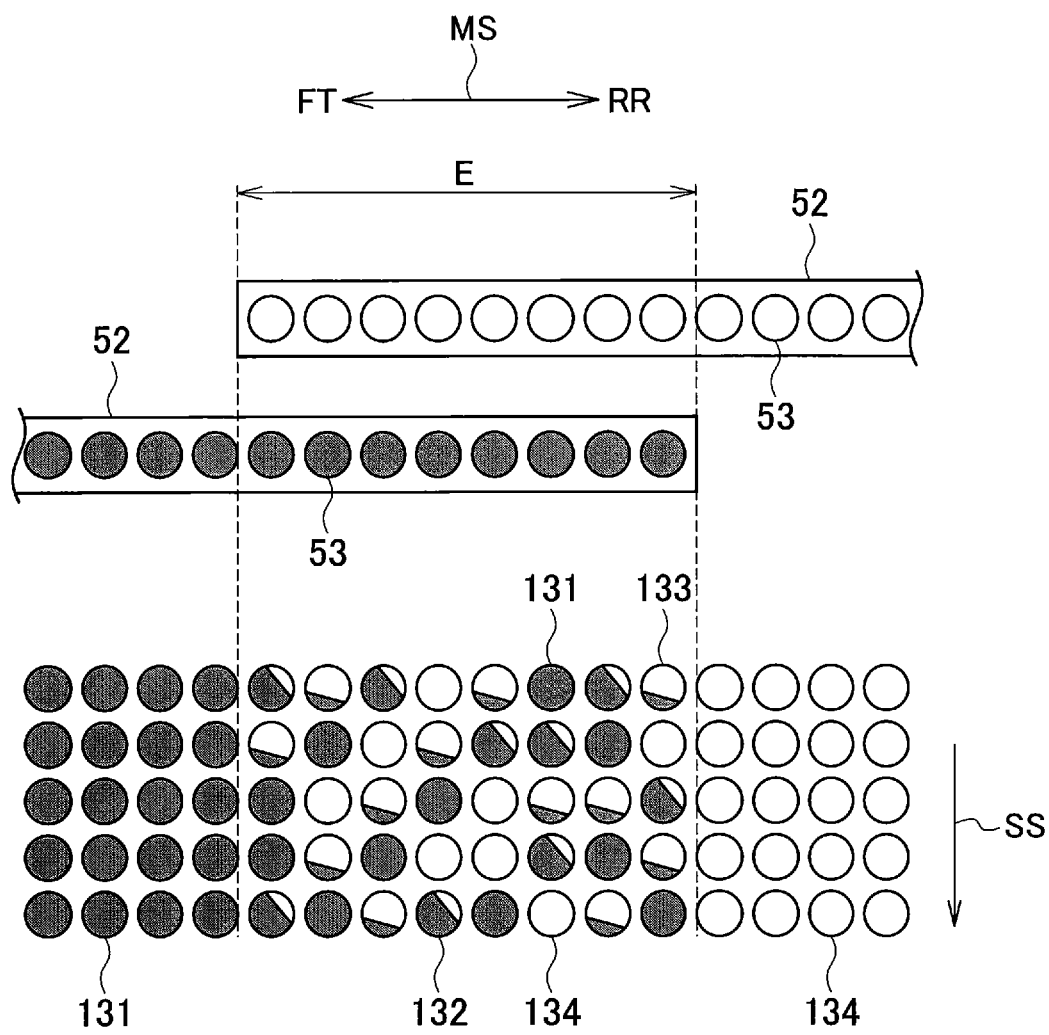
FIG. 17 is a view illustrating an example of a dot image of an image printed in the overlap portion of the inkjet heads when the distribution processing of "high" intensity is performed.

FIG. 17 illustrates a dot image of an image printed in the overlap portion E when the distribution processing of "high" intensity as described above is performed. Also in the example of FIG. 17, as in the example of FIG. 13, the number of drops for each pixel in the image data is assumed to be 3.

In FIG. 17, the dots 131 to 134 are the same as those in FIG. 13. In FIG. 17, the distribution of the number of drops to the front inkjet head 52 and the rear inkjet head 52 by use of random numbers causes the dots 131 to 134 to be randomly formed in the entire area printed in the overlap portion E.

Accordingly, in the distribution processing of "high" intensity, the distribution of the number of drops is more random than in the aforementioned distribution processing of "low" intensity and the density difference in the printed image caused by the differences in ejection characteristics between the inkjet heads 52 is made even less visible. As a result, the color unevenness in the image printed in the overlap portion E is further reduced.

However, when the distribution processing of "high" intensity is performed, there is a possibility that the distribution of the number of drops is excessively randomly performed and the graininess of the image becomes more noticeable, depending on the contents of the image and the degree of differences in ejection characteristics between the inkjet heads 52 overlapping each other. The print image quality may thus become lower than that in the case where the distribution processing of "low" intensity is performed. Accordingly, in the inkjet printer 3, it is possible select and set either "high" or "low" as the intensity of the distribution processing.

As described above, in the inkjet printer 3, the conveyance speed of the web W fluctuates due to off-centering of the rollers rotating in the conveyor 21 such as the conveyance rollers 43.

Accordingly, if the aforementioned distribution processing is performed, abrupt fluctuation in the conveyance speed of the web W may cause the landing positions of the ink ejected by one inkjet head 52 to be shifted from the landing positions of the ink ejected from the other inkjet head 52 in the overlap portion E. If the distribution processing is performed and the shifting of the landing positions of the ink as described above occurs, the print image quality in the overlap portion E may become lower than that in the normal processing.

In this configuration, the image processor 86 is capable of selecting one of the distribution processing and the normal processing for each line in the main scanning direction in the image. Accordingly, when the distribution processing is enabled, the image processor 86 selects one of the distribution processing and the normal processing for each line in the main scanning direction in the image based on the conveyance profile data.

Specifically, in the printing in which the distribution processing is enabled, the image processor 86 determines whether it is a normal processing period or not based on the conveyance profile data. In this case, the normal processing period is a period set in advance as a period in which there occurs fluctuation (acceleration, deceleration) in the conveyance speed of the web W so abrupt that the shifting of the ink landing positions occurs in the image printed in the overlap portion E. The normal processing period is specified based on the number of pulses outputted from the encoder 45 from the timing at which the reference sensor 46 detects the reference mark on the guide roller 34 in the conveyance profile data. There may be multiple normal processing periods in a fluctuation cycle of the conveyance speed of the web W corresponding to one revolution of the rollers rotating in the conveyor 21.

When determining that it is the normal processing period, the image processor 86 switches the processing for each line performed on the image data in the range corresponding to the overlap portion E when the image data is to be divided into the pieces of image data for the respective inkjet heads 52, from the distribution processing to the normal processing. When determining that the normal processing period has ended, the image processor 86 returns the processing for each line from the normal processing to the distribution processing.

As described above, in the inkjet printer 3, the image processor 86 executes the distribution processing in which the number of drops of ink for each pixel in the image to be printed in the overlap portion E is distributed based on the random number between the nozzle 53 in one of the overlapping inkjet heads 52 and the nozzle 53 in the other inkjet head 52, in a period other than the normal processing period when the distribution processing is enabled. This distribution processing achieves a random combination of the number of drops to be ejected by the nozzle 53 in the one inkjet head 52 and the number of drops to be ejected by the nozzle 53 in the other inkjet head 52 in the region printed in the overlap portion E. Accordingly, the density difference caused by the differences in ejection characteristics between the inkjet heads 52 is less visible in the image printed in the overlap portion E. As a result, the color unevenness in the image printed in the overlap portion E decreases and the decrease in the print image quality can be thereby lessened.

Moreover, the image processor 86 performs, as the distribution processing performed when the intensity is set to "low," processing in which the number of drops of the ink for each pixel in the image to be printed in the overlap portion E is distributed based on the random number between the nozzle 53 in the one inkjet head 52 and the nozzle 53 in the other inkjet head 52 while the priorities of distribution of the number of drops to the one inkjet head 52 and the other inkjet head 52 are changed by degrees in the main scanning direction in the overlap portion E. This can reduce the density difference in the printed image caused by the differences in ejection characteristics between the inkjet heads 52 overlapping each other while suppressing the decrease in the print image quality caused by excessively-random distribution of the number of drops.

Moreover, when the distribution processing is enabled, the image processor 86 selects one of the distribution processing and the normal processing for each line in the main scanning direction in the image based on the conveyance profile data. Specifically, when the distribution processing is enabled, the image processor 86 switches the processing from the distribution processing to the normal processing for each line printed in the normal processing period. This can reduce the ink landing position shifting in the image printed in the overlap portion E which may be caused by fluctuation in the conveyance speed of the web W if the distribution processing is performed. As a result, the decrease in the print image quality can be further lessened.

Second Embodiment

Figure 18:
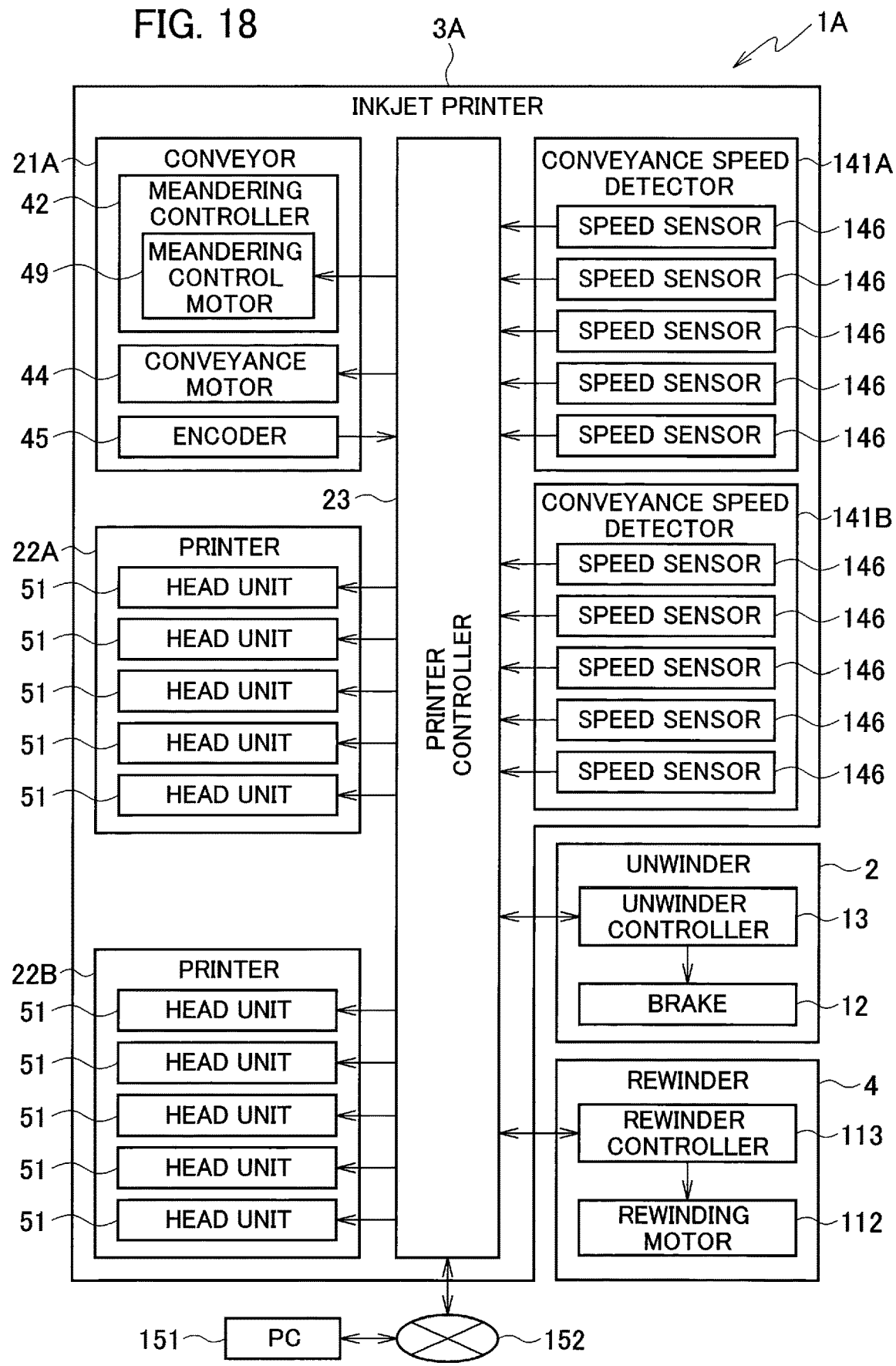
FIG. 18 is a control block diagram of a print system including an inkjet printer according to a second embodiment.
Figure 19:
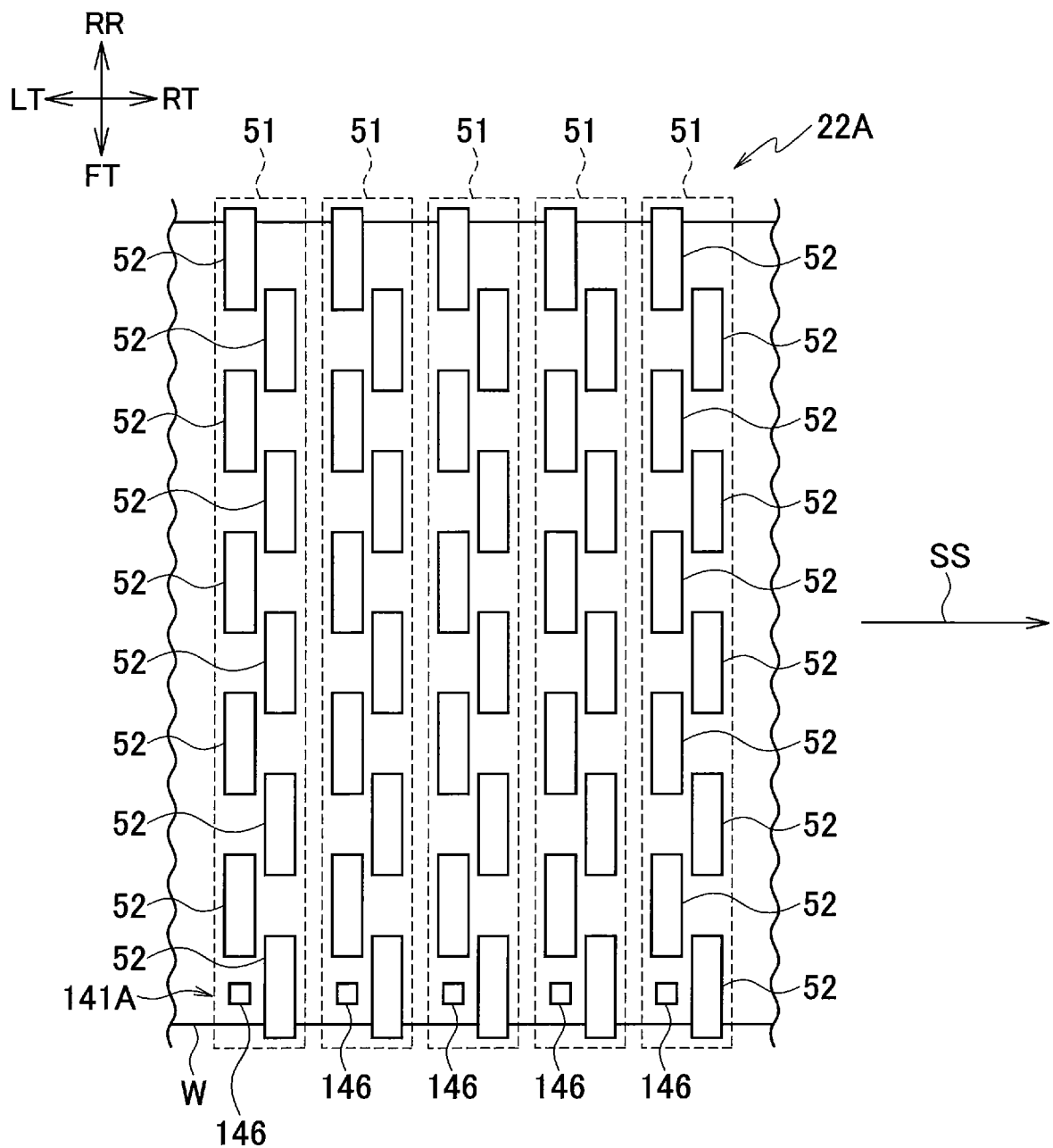
FIG. 19 is a view illustrating a conveyance speed detector.

Next, a second embodiment partially changed from the aforementioned first embodiment is described. FIG. 18 is a control block diagram of a print system 1A including an inkjet printer 3A according to the second embodiment. FIG. 19 is a view illustrating a conveyance speed detector 141A in the inkjet printer 3A included in the print system 1A of FIG. 18.

As illustrated in FIG. 18, the print system 1A according to the second embodiment has a configuration in which the inkjet printer 3 of the first embodiment is replaced by the inkjet printer 3A. The inkjet printer 3A has a configuration in which the conveyor 21 in the inkjet printer 3 of the first embodiment is replaced by a conveyor 21A and conveyance speed detectors 141A, 141B are added.

The conveyor 21A has a configuration in which the reference sensor 46 is omitted from the conveyor 21 of the first embodiment.

The conveyance speed detectors 141A, 141B detect the conveyance speed of the web W at the positions of the respective head units 51 in the printers 22A, 22B. The conveyance speed detectors 141A, 141B each have five speed sensors (detectors) 146.

As illustrated in FIG. 19, the speed sensors 146 are provided for each of the head units 51 to be arranged near one of the upstream inkjet heads 52 in the head unit 51. Note that, in FIG. 19, the conveyance speed detector 141A out of the conveyance speed detectors 141A, 141B is illustrated as a representative. The speed sensors 146 are connected to the sensor I/F of the printer controller 23. The speed sensors 146 are formed of, for example, laser Doppler velocimeters.

In the second embodiment, when the distribution processing is enabled, the image processor 86 selects one of the distribution processing and the normal processing for each line in the main scanning direction in the image based on acceleration and deceleration of the conveyance speed of the web W detected by the speed sensors 146, instead of using the conveyance profile data in the first embodiment.

Specifically, the image processor 86 calculates the acceleration and deceleration of the conveyance speed of the web W at the position of each speed sensor 146 every predetermined time, based on the conveyance speed of the web W detected by the speed sensor 146.

Then, for each head unit 51, when the degree of acceleration or deceleration of the conveyance speed of the web W detected by the speed sensor 146 corresponding to the head unit 51 reaches or exceeds a threshold, the image processor 86 switches the processing for each line performed on the image data in the range corresponding to the overlap portion E when the image data for the head unit 51 is to be divided into the pieces of image data for the respective inkjet heads 52, from the distribution processing to the normal processing.

When the degree of acceleration or deceleration of the conveyance speed of the web W detected by the speed sensor 146 corresponding to the head unit 51 returns to a state below the threshold, the image processor 86 returns the processing for each line from the normal processing to the distribution processing.

As described above, in the second embodiment, when the distribution processing is enabled, the image processor 86 selects one of the distribution processing and the normal processing for each line in the main scanning direction in the image based on the acceleration and deceleration of the conveyance speed of the web W detected by the speed sensors 146. This can reduce the ink landing position shifting in the image printed in the overlap portion E which may be caused by the fluctuation in the conveyance speed of the web W if the distribution processing is performed. As a result, the decrease in the print image quality can be further lessened.

Other Embodiments

Although the present invention has been described above by using the first and second embodiments, it should not be understood that the description and drawings forming part of this disclosure limit the present invention. From this disclosure, various alternative embodiments, examples, and operation techniques will be found by those skilled in the art.

In the aforementioned first embodiment, when the distribution processing is enabled, the processing of selecting one of the distribution processing and the normal processing is performed for each line in the main scanning direction in the image based on the conveyance profile data. However, this processing may be omitted. Also in such a case, the distribution processing can reduce the color unevenness in the image printed in the overlap portion E and thereby lessen the decrease in the print image quality.

In the aforementioned first embodiment, description is given of the case where, in the distribution processing of "low" intensity, the priority of distribution of the number of drops to one of the inkjet heads 52 and the other inkjet head 52 in the overlap portion E is changed in two steps. However, the priority of distribution of the number of drops to one of the inkjet heads 52 and the other inkjet head 52 in the overlap portion E may be changed in three or more steps, depending on the number of gray levels (maximum drop number) in the image data to be printed.

Although the configuration in which the unwinder and the rewinder are connected to the inkjet printer as separate devices is described in the aforementioned first and second embodiments, a configuration in which the unwinder and rewinder are incorporated in the inkjet printer may be employed.

As described above, the present invention includes various embodiments and the like which are not described herein as a matter of course. Accordingly, the technical scope of the present invention should be determined only by the matters specifying the invention in the scope of claims regarded as appropriate based on the aforementioned description.

The entire contents of Japanese Patent Application No. 2017-059086 (filed on Mar. 24, 2017) are incorporated herein by reference.

The invention claimed is:

1. An inkjet printer comprising:
a first inkjet head including first nozzles arranged in a main scanning direction, the first inkjet head configured to eject ink to a print medium conveyed in a direction orthogonal to the main scanning direction;
a second inkjet head including second nozzles arranged in the main scanning direction, the second inkjet head configured to eject ink to the print medium conveyed in the direction orthogonal to the main scanning direction;
a random number generator; and
a controller configured to control the first inkjet head and the second inkjet head to eject the ink from the first nozzles and the second nozzles respectively and print an image on the print medium, based on an image data indicating a number of drops of ink for each of pixels, wherein
the first inkjet head and the second inkjet head are arranged to partially overlap each other in the main scanning direction,
the controller is configured to determine the random distribution of and to randomly distribute the number of drops of the ink for each of the pixels in the image to be printed by an overlap portion of the first inkjet head and the second inkjet head based on a random number generated by the random number generator between the first nozzles of the first inkjet head and the second nozzles of the second inkjet head overlapping each other using distribution processing, and
when determining the random distribution, the controller is configured to
drive the random number generator to generate a random number with respect to the first nozzles of the first inkjet head in the overlap portion and determine the number of drops of the ink to be ejected from each of the first nozzles based on the generated random number, and
drive the random number generator to generate a random number with respect to the second nozzles of the second inkjet head in the overlap portion and determine the number of drops of the ink to be ejected from each of the second nozzles based on the generated random number.

2. The inkjet printer according to claim 1, wherein the controller is configured to determine the random distribution in which priorities of distribution of the number of drops to the first inkjet head and the second inkjet head are changed by degrees in the main scanning direction in the overlap portion.

3. The inkjet printer according to claim 1, wherein when determining the random distribution, the controller is configured to:
perform an unbiased distribution of the number of drops of the ink with respect to the first nozzles of the first inkjet head in the overlap portion; and
perform an unbiased distribution of the number of drops of the ink with respect to the second nozzles of the second inkjet head in the overlap portion.

4. The inkjet printer according to claim 1, wherein when determining the random distribution, the controller is configured to distribute the number of drops of the ink with respect to the first nozzles of the first inkjet head in the overlap portion and the second nozzles of the second inkjet head in the overlap portion, by using a same allocation table in which a number of drops in the image data of each of the pixels, a random number, and a number of drops to be distributed to the first nozzles of the first inkjet head in the overlap portion and the second nozzles of the second inkjet head in the overlap portion are associated with one another.

5. The inkjet printer according to claim 1, wherein
the random number generator is configured to generate a random number for each line printed by the first and second inkjet heads in the main scanning direction, and
the controller is configured to determine the random distribution based on each random number generated by the random number generator for each line.

6. An inkjet printer comprising:
a first inkjet head including first nozzles arranged in a main scanning direction, the first inkjet head configured to eject ink to a print medium conveyed in a direction orthogonal to the main scanning direction;
a second inkjet head including second nozzles arranged in the main scanning direction, the second inkjet head configured to eject ink to the print medium conveyed in the direction orthogonal to the main scanning direction; and
a controller configured to control the first inkjet head and the second inkjet head to eject the ink from the first nozzles and the second nozzles respectively and print an image on the print medium, based on an image data indicating a number of drops of ink for each of pixels, wherein
the first inkjet head and the second inkjet head are arranged to partially overlap each other in the main scanning direction,
the controller is configured to perform a distribution processing of distributing the number of drops of the ink for each of the pixels in the image to be printed by an overlap portion of the first inkjet head and the second inkjet head based on a random number between the first nozzles of the first inkjet head and the second nozzles of the second inkjet head overlapping each other, and
the controller:
is capable of selecting one of the distribution processing or a normal processing for each of lines in the main scanning direction in the image, the normal processing being a processing of switching nozzles to be used in printing of the image in the overlap portion between the first nozzles of the first inkjet head and the second nozzles of the second inkjet head at a specified position in the main scanning direction; and
is configured to select one of the distribution processing or the normal processing for each of the lines in the main scanning direction in the image based on a profile data indicating fluctuation in a conveyance speed of the print medium.

7. An inkjet printer comprising:
a first inkjet head including first nozzles arranged in a main scanning direction, the first inkjet head configured to eject ink to a print medium conveyed in a direction orthogonal to the main scanning direction;
a second inkjet head including second nozzles arranged in the main scanning direction, the second inkjet head configured to eject ink to the print medium conveyed in the direction orthogonal to the main scanning direction; and
a controller configured to control the first inkjet head and the second inkjet head to eject the ink from the first nozzles and the second nozzles respectively and print an image on the print medium, based on an image data indicating a number of drops of ink for each of pixels; and
a detector configured to detect a conveyance speed of the print medium, wherein
the first inkjet head and the second inkjet head are arranged to partially overlap each other in the main scanning direction,
the controller is configured to perform a distribution processing of distributing the number of drops of the ink for each of the pixels in the image to be printed by an overlap portion of the first inkjet head and the second inkjet head based on a random number between the first nozzles of the first inkjet head and the second nozzles of the second inkjet head overlapping each other, and
the controller:
is capable of selecting one of the distribution processing or a normal processing for each of lines in the main scanning direction in the image, the normal processing being a processing of switching nozzles to be used in printing of the image in the overlap portion between the first nozzles of the first inkjet head and the second nozzles of the second inkjet head at a specified position in the main scanning direction; and
is configured to select one of the distribution processing or the normal processing for each of the lines in the main scanning direction in the image based on an acceleration and a deceleration of the conveyance speed of the print medium detected by the detector.

* * * * *